US011355252B2

(12) United States Patent
Lobscheid et al.

(10) Patent No.: US 11,355,252 B2
(45) Date of Patent: Jun. 7, 2022

(54) CONTROL ROD DRIVE MECHANISM WITH HEAT PIPE COOLING

(71) Applicant: NuScale Power, LLC, Corvallis, OR (US)

(72) Inventors: Christian Lobscheid, Corvallis, OR (US); Derek Noel, Albany, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 384 days.

(21) Appl. No.: 16/229,554

(22) Filed: Dec. 21, 2018

(65) Prior Publication Data

US 2020/0027588 A1 Jan. 23, 2020

Related U.S. Application Data

(63) Continuation-in-part of application No. 15/858,727, filed on Dec. 29, 2017, now Pat. No. 10,847,272.
(Continued)

(51) Int. Cl.
*G21C 7/14* (2006.01)
*G21C 15/257* (2006.01)
*H02K 9/20* (2006.01)

(52) U.S. Cl.
CPC ............ *G21C 7/14* (2013.01); *G21C 15/257* (2013.01); *H02K 9/20* (2013.01)

(58) Field of Classification Search
CPC ........ G21C 7/14; G21C 15/257; G21C 15/14; H02K 9/20
(Continued)

(56) References Cited

U.S. PATENT DOCUMENTS

| 65,169 A | 5/1867 | Card |
| 1,159,262 A | 11/1915 | Ottum |

(Continued)

FOREIGN PATENT DOCUMENTS

| EP | 225511 | 6/1987 |
| EP | 811990 | 12/1997 |

(Continued)

OTHER PUBLICATIONS

International Preliminary Report on Patentability for International Application No. PCT/US2017/069034, dated Jul. 11, 2019, pp. 9.
(Continued)

*Primary Examiner* — Jack W Keith
*Assistant Examiner* — Daniel Wasil
(74) *Attorney, Agent, or Firm* — Perkins Coie LLP

(57) ABSTRACT

A representative cooling system for a nuclear reactor control rod drive mechanism (CRDM) includes an evaporation section located within or next to the CRDM and a condensation section fluidly coupled to the evaporation section. The cooling system includes a set of heat fins coupled to drive coils in the CRDM and heat pipes that extend through the drive coils and heat fins. A fluid evaporates while in the evaporation section of the heat pipes from heat generated by the CRDM and moves out of the evaporation section into the condensation section in the heat fins. The fluid cools and condensates while in the condensation section, recirculating back into the evaporation section. This passive natural circulation cooling system reduces or eliminates the number of water hoses, piping, and other water pumping equipment typically used for cooling a CRDM thereby increasing nuclear reactor reliability and simplifying nuclear reactor operation and maintenance.

13 Claims, 22 Drawing Sheets

Related U.S. Application Data

(60) Provisional application No. 62/736,250, filed on Sep. 25, 2018, provisional application No. 62/441,015, filed on Dec. 30, 2016.

(58) Field of Classification Search
USPC .................................... 376/228, 232, 233
See application file for complete search history.

(56) References Cited

U.S. PATENT DOCUMENTS

| | | | |
|---|---|---|---|
| 1,580,352 A | 4/1926 | Ventresca | |
| 1,897,561 A | 2/1933 | Manucci | |
| 2,179,594 A | 6/1938 | Johnson | |
| 2,445,106 A | 2/1946 | Dempster | |
| 2,518,621 A | 8/1950 | Hull et al. | |
| 2,894,779 A | 7/1959 | Kushner | |
| 2,961,393 A | 11/1960 | Monson | |
| 2,968,205 A | 1/1961 | Springate | |
| 3,036,964 A | 5/1962 | Horning | |
| 3,107,209 A | 10/1963 | Frisch | |
| 3,346,549 A | 10/1967 | Ford et al. | |
| 3,402,767 A * | 9/1968 | Bohdansky | F28D 15/046 165/104.26 |
| 3,595,748 A | 7/1971 | Frisch et al. | |
| 3,625,816 A | 12/1971 | Aleite | |
| 3,734,825 A | 5/1973 | Schabert | |
| 3,929,305 A | 12/1975 | Sabol | |
| 3,935,063 A | 1/1976 | Dunckel | |
| 3,992,255 A * | 11/1976 | DeWesse | G21C 7/12 376/228 |
| 4,120,172 A | 10/1978 | Pierce | |
| 4,134,789 A | 1/1979 | Aubert | |
| 4,147,589 A | 4/1979 | Roman et al. | |
| 4,437,054 A | 5/1984 | Veronesi | |
| 4,472,348 A | 9/1984 | Desfontaines | |
| 4,481,164 A | 11/1984 | Bollinger | |
| 4,484,093 A | 11/1984 | Smith | |
| 4,544,521 A | 10/1985 | Millot | |
| 4,681,728 A | 7/1987 | Veronesi | |
| 4,696,786 A | 9/1987 | Frizot | |
| 4,716,013 A | 12/1987 | Veronesi | |
| 4,851,183 A | 7/1989 | Hampel | |
| 4,859,404 A | 8/1989 | Richard | |
| 4,921,041 A | 5/1990 | Akachi | |
| 5,253,702 A | 10/1993 | Davidson et al. | |
| 5,466,114 A | 11/1995 | Swain | |
| 5,669,729 A | 9/1997 | Attix | |
| 5,711,629 A | 1/1998 | Attix | |
| 5,761,260 A | 6/1998 | Bergamaschi | |
| 6,266,386 B1 | 7/2001 | Patel | |
| 6,275,556 B1 | 8/2001 | Kinney | |
| 6,327,322 B1 | 12/2001 | Burton | |
| 6,718,001 B2 | 4/2004 | Hidaka et al. | |
| 6,810,099 B2 | 10/2004 | Nakamaru et al. | |
| 9,865,365 B2 | 1/2018 | Bang et al. | |
| 2005/0077660 A1 | 4/2005 | Mucciardi et al. | |
| 2012/0148007 A1 | 6/2012 | Allen et al. | |
| 2013/0223579 A1 | 8/2013 | Allen | |
| 2013/0235968 A1 | 9/2013 | Young et al. | |
| 2016/0012924 A1 | 1/2016 | McClure et al. | |
| 2016/0027536 A1 | 1/2016 | McClure et al. | |
| 2016/0217578 A1 | 7/2016 | Can et al. | |
| 2016/0232996 A1 | 8/2016 | Liszkai | |
| 2017/0117063 A1 | 4/2017 | Keller et al. | |
| 2017/0206990 A1 * | 7/2017 | Carvajal | G21C 17/12 |
| 2018/0019027 A1 | 1/2018 | Morgan et al. | |

FOREIGN PATENT DOCUMENTS

| | | |
|---|---|---|
| FR | 2677164 | 12/1992 |
| FR | 2749435 | 5/1996 |
| JP | S58127385 | 8/1983 |
| JP | S6383693 | 4/1988 |
| KR | 200453164 | 4/2011 |

OTHER PUBLICATIONS

International Search Report and Written Opinion for PCT/US2017/069034; dated Dec. 29, 2017; 14 pages.

International Search Report and Written Opinion for PCT/US2018/067128; dated Jun. 13, 2019; 13 pages.

NASA Kilopower Overview and Mission Applications (NASA Presentation, Las Vegas, Jan. 18, 2018).

Westinghouse eVinci™ Micro Reactor (www.westinghousenuclear.com/New-Plants/eVinci-Micro-Reactor).

Heat pipe, Wikipedia, downloaded Feb. 26, 2018.

* cited by examiner

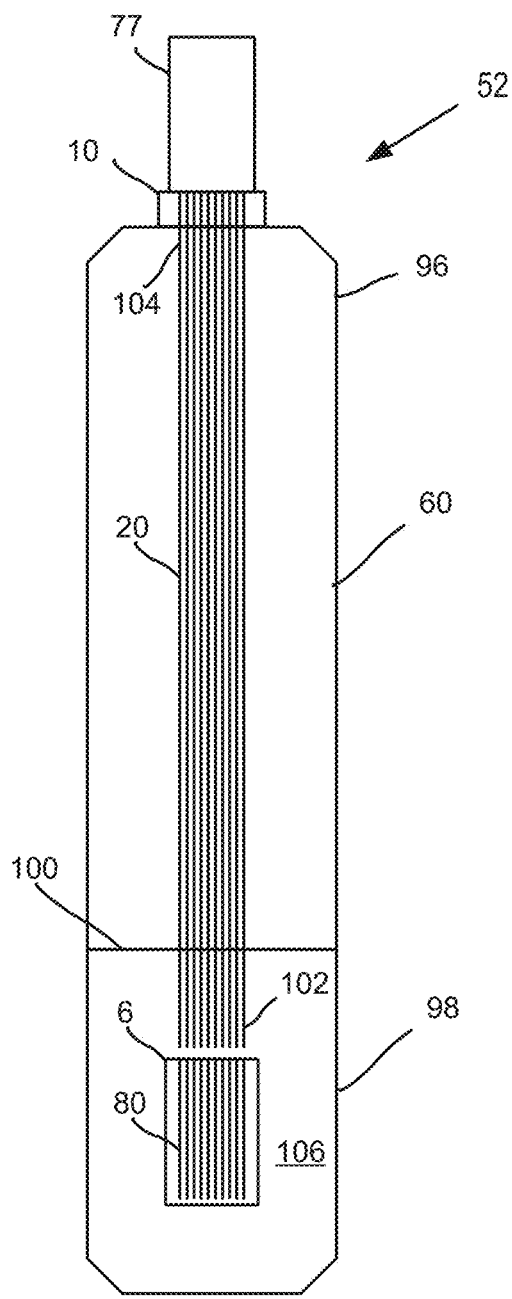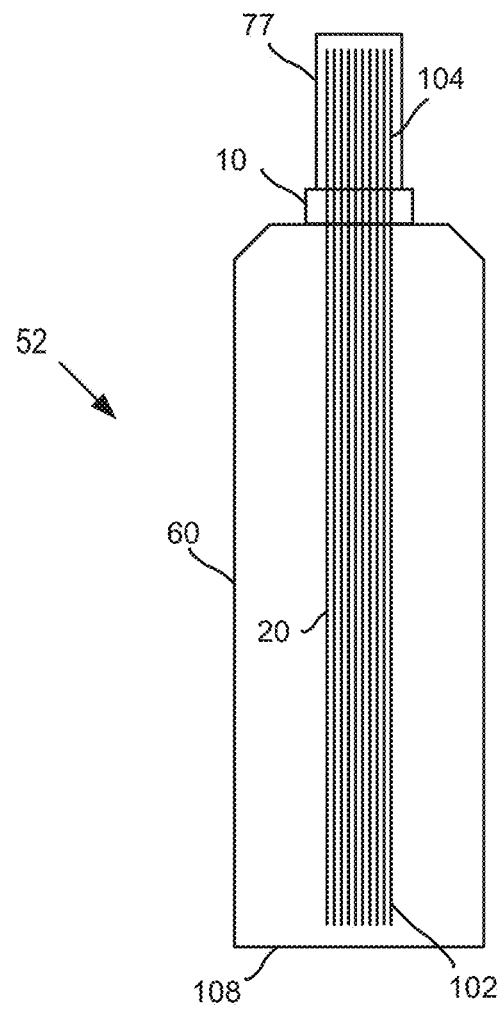
FIG. 4A
FIG. 4B

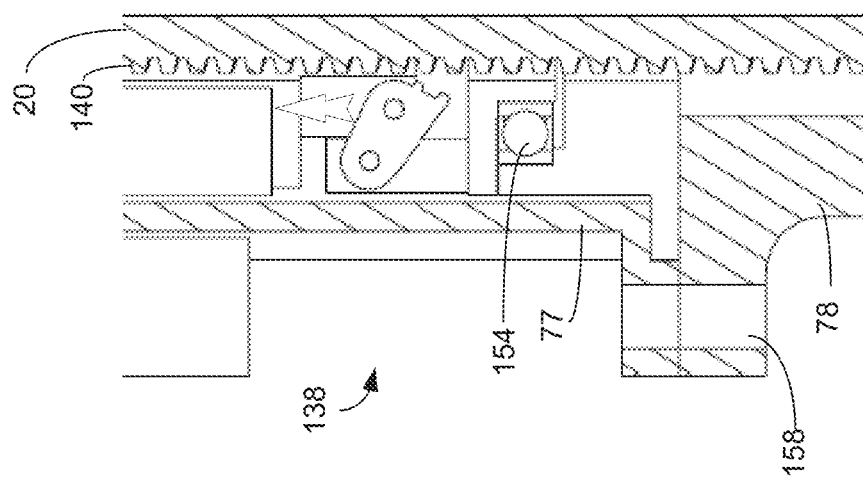
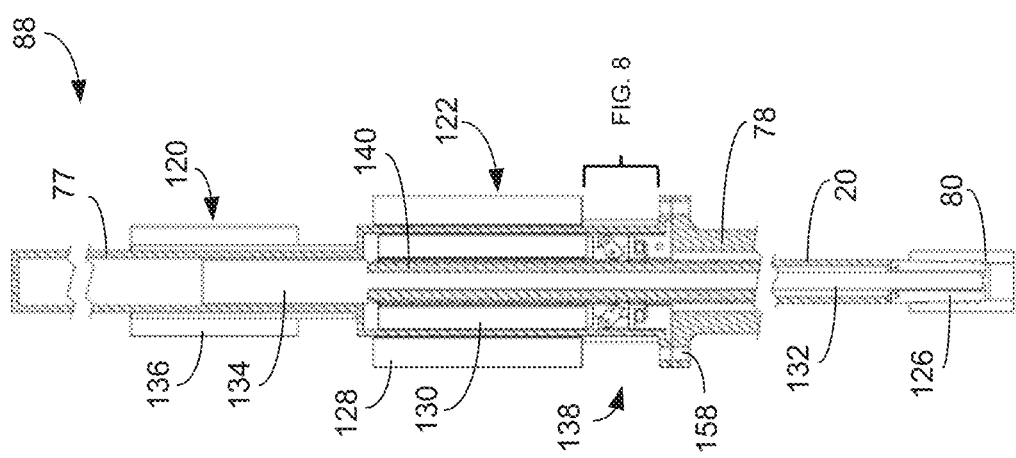

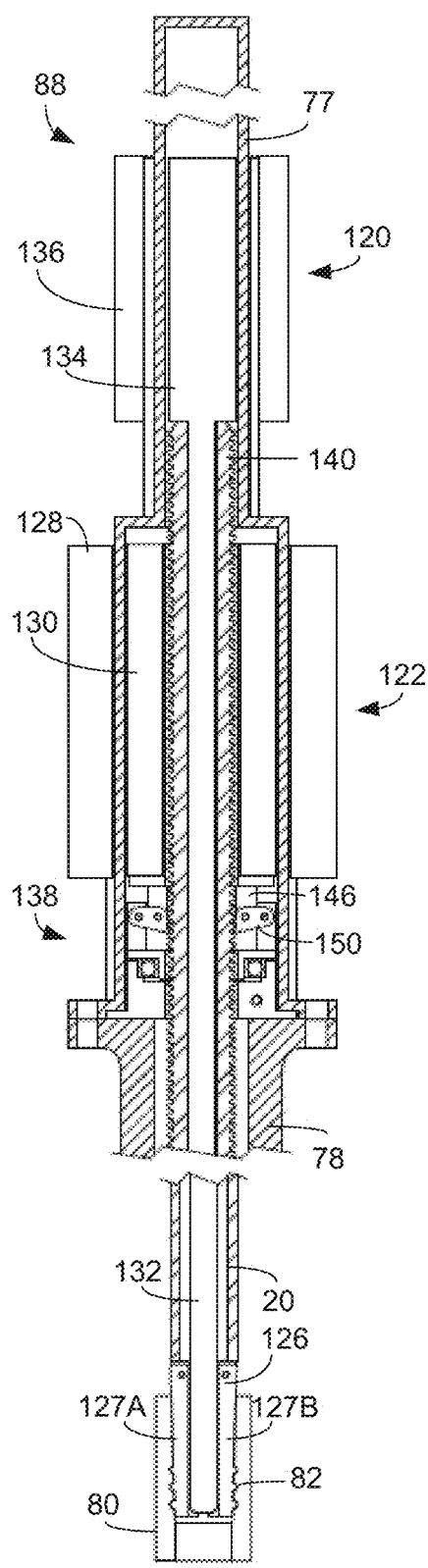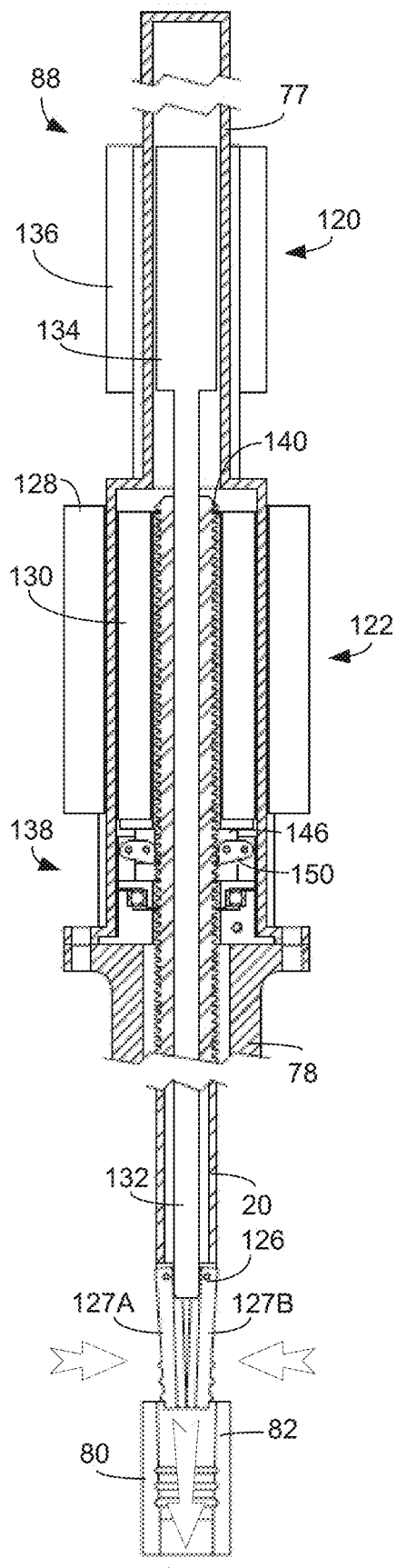
FIG. 11C
FIG. 11D

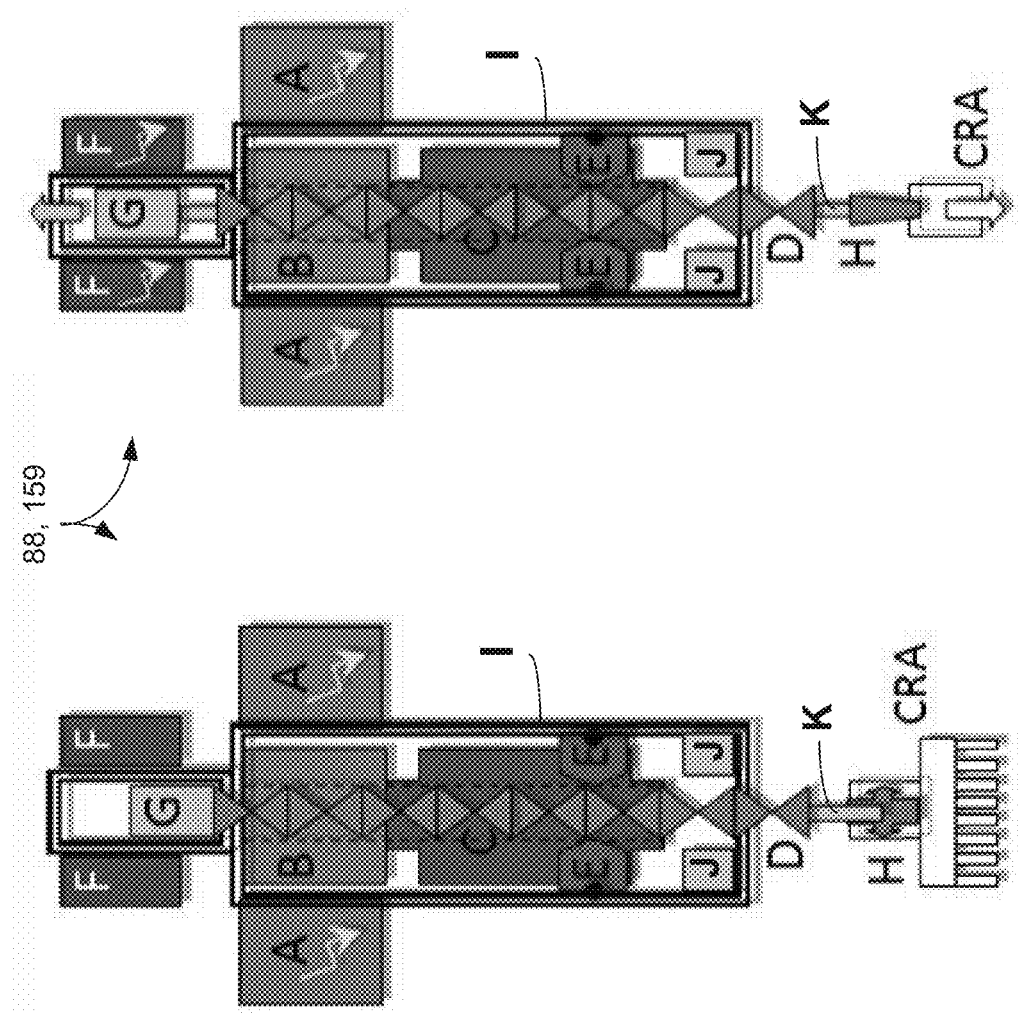

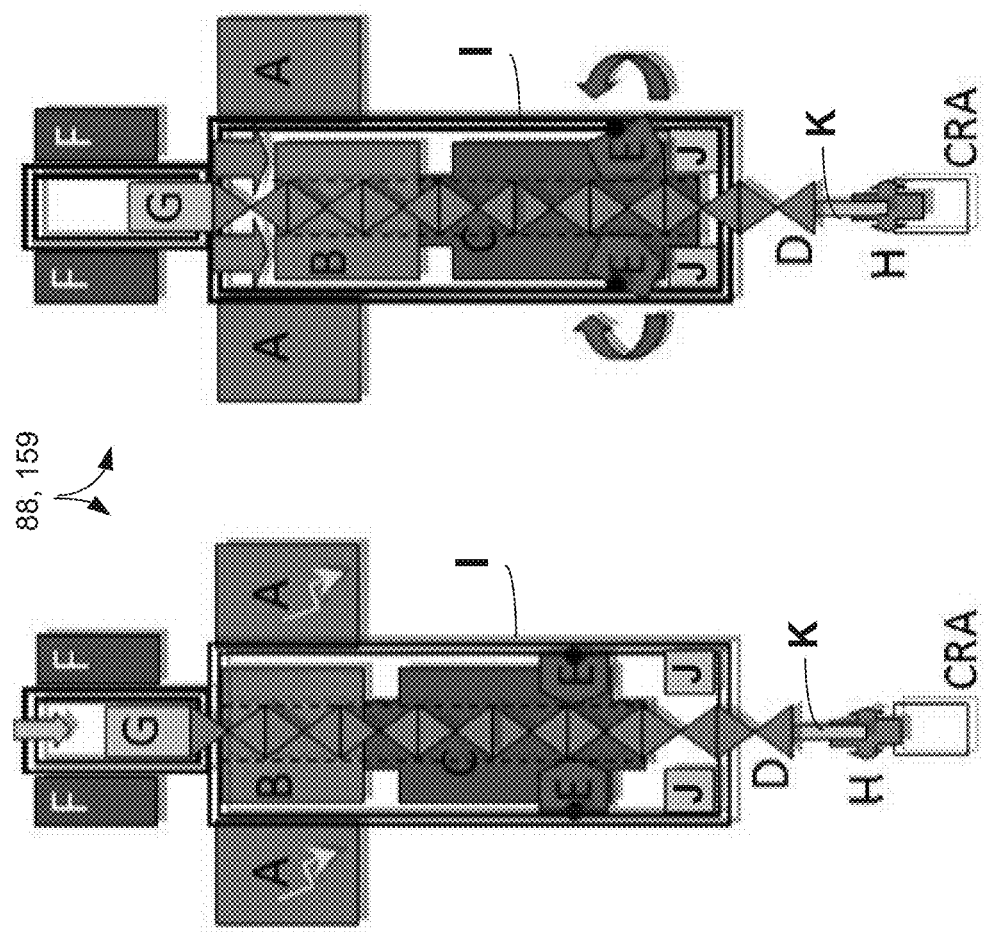

CONTROL ROD DRIVE MECHANISM WITH HEAT PIPE COOLING

This application claims priority to U.S. Provisional Patent Application No. 62/736,250, filed on Sep. 25, 2018 entitled: CONTROL ROD DRIVE MECHANISM WITH HEAT PIPE COOLING, the contents of which are herein incorporated by reference in their entirety.

This application is also a continuation-in-part of U.S. patent application Ser. No. 15/858,727 filed Dec. 29, 2017, entitled: CONTROL ROD DRIVE MECHANISM (CDRM) WITH REMOTE DISCONNECT MECHANISM which claims priority to U.S. Provisional Applications No. 62/441,015 the contents of which are herein incorporated by reference in their entireties.

GOVERNMENT INTEREST

This invention was made with Government support under Contract No. DE-NE0000633 awarded by the Department of Energy. The Government has certain rights in this invention.

TECHNICAL FIELD

This disclosure generally relates to a cooling system for a nuclear reactor control rod drive mechanism.

BACKGROUND

A control rod drive mechanism (CRDM) on top of a nuclear reactor pressure vessel (RPV) may maneuver or release drive shafts by gravity during a rapid control rod insertion (SCRAM). The CRDM may be located within an upper containment vessel (CNV) that contains the RPV and may use electrical motors to control movement of the drive shafts. The electrical motors may be driven remotely by electromagnetic force across a pressure vessel boundary.

CRDM electrical motors are typically cooled by Reactor Component Cooling Water Systems (RCCWS) or forced air cooling. The water cooled systems may incorporate a complex arrangement of water hoses to circulate water that removes heat from the electrical motor coils. The hoses are difficult to remove when the RPV is removed from the CNV for refueling. A CRDM failure caused by leaks or blockages in the cooling system hoses may trigger a Containment Evacuation System (CES) to shut down the nuclear reactor. Alternative air cooled systems may not be adequate for some nuclear reactors. For example, an evacuated CNV creates a vacuum environment around the outside of the RPV eliminating convection heat transfer as a cooling option.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIGS. 4A and 4B are schematic diagrams showing disassembly of a reactor pressure vessel.

FIG. 7 is a side sectional view of the control rod drive mechanism in FIG. 5.

FIG. 8 is a further enlarged detail side sectional view of a single-hinge latch assembly within the control rod drive mechanism.

FIGS. 11A-11E show side sectional views of the single-hinge type control rod drive mechanism in FIG. 5 in different operating states.

FIGS. 16A-16G are schematic diagrams showing different control rod drive mechanism (FIG. 5 or FIG. 12) operating states, wherein FIGS. 16A-16B illustrate an example process for using a drive mechanism to engage and linearly move a drive shaft.

FIGS. 16C-16G illustrate an example process for using a remote disconnect system to decouple a drive shaft from a control rod assembly.

DETAILED DESCRIPTION

A simplified cooling system uses heat pipes to cool electrical motors in Control Rod Drive Mechanisms (CRDM) while operating in an evacuated containment vessel (CNV). The cooling system does not rely on active water cooling through a Reactor Component Cooling Water System (RCCWS) and greatly simplifies CRDM, CNV and RCCWS designs avoiding potential Containment Evacuation System (CES) triggers and CRDM failures due to unintended cooling leaks or blockages.

The cooling system overcomes cooling restrictions for CRDMs that operate in vacuum environments that prevent effective convective heat transfer. The heat pipes may transfer heat from CRDM electrical coils to finned heat exchangers located above the CRDM electrical coils increasing the ability to transfer heat through radiation through the vacuum to the surrounding CNV vessel walls. The cooling system may encompass the same or a larger diametrical envelope than the electrical coils and does not need external power or external fluid transfer. In an alternate option, the cold end of the heat pipes may be mounted directly to the CNV vessel wall above the CRDMs to further promote conductive heat transfer.

Figure 1:
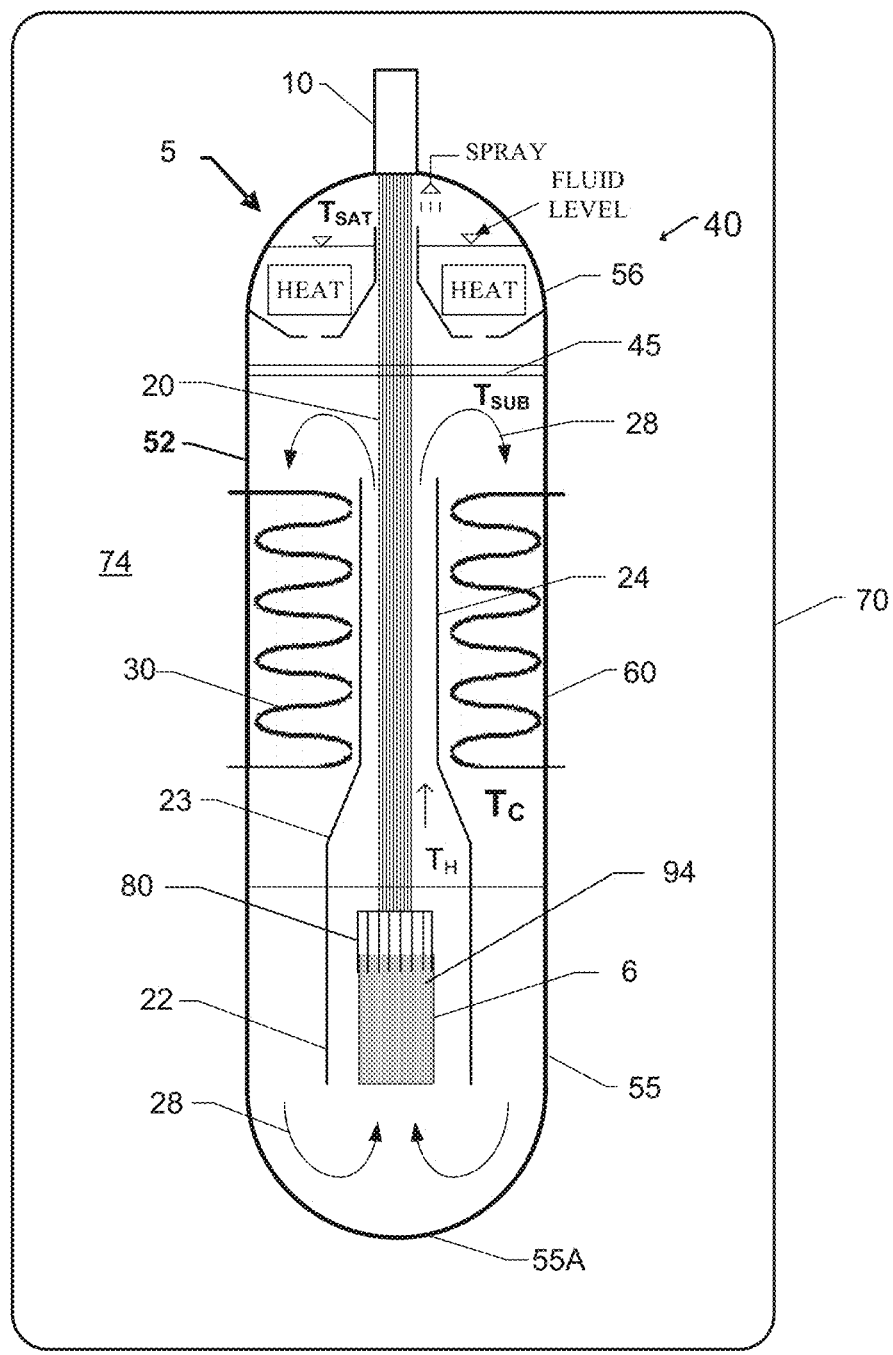
FIG. 1 shows a schematic diagram of an example nuclear reactor module.

FIG. 1 illustrates a cross-sectional view of an example integral reactor module 5 comprising reactor pressure vessel 52. Reactor core 6 is shown located near a lower head 55 of the reactor pressure vessel 52. The reactor core 6 may be located in a shroud 22 which surrounds reactor core 6 about its sides. A riser section 24 is located above the reactor core 6 surrounded by steam generators 30.

When primary coolant 28 is heated by reactor core 6 as a result of fission events, primary coolant 28 may be directed from shroud 22 up into an annulus 23 located above reactor core 6, and out of riser 24. This may result in additional primary coolant 28 being drawn into shroud 22 to be heated in turn by reactor core 6, which draws yet more primary coolant 28 into shroud 22. The primary coolant 28 that emerges from riser 24 may be cooled down by steam generators 30 and directed towards the outside of the reactor pressure vessel 52 and then returned to the bottom of the reactor pressure vessel 52 through natural circulation.

Primary coolant 28 circulates past the reactor core 6 to become high-temperature coolant TH and then continues up through the riser section 24 where it is directed back down the annulus and cooled off by steam generators 30 to become low-temperature coolant TC. One or more control rod drive mechanisms (CRDM) 10 are operably coupled to a number of drive shafts 20 that may be configured to interface with a plurality of control rod assemblies 80 located above reactor core 6.

A reactor pressure vessel baffle plate 45 may be configured to direct the primary coolant 28 towards a lower end 55 of the reactor pressure vessel 52. A surface of the reactor pressure vessel baffle plate 45 may come into direct contact with and deflect the primary coolant 28 that exits the riser section 24. In some examples, the reactor pressure vessel baffle plate 45 may be made of stainless steel or other materials.

The lower end 55 of the reactor pressure vessel 52 may comprise an ellipsoidal, domed, concave, or hemispherical portion 55A, wherein the ellipsoidal portion 55A directs the primary coolant 28 towards the reactor core 6. The ellipsoidal portion 55A may increase flow rate and promote natural circulation of the primary coolant through the reactor core 6. Further optimization of the coolant flow 28 may be obtained by modifying a radius of curvature of the reactor pressure vessel baffle plate 45 to eliminate/minimize boundary layer separation and stagnation regions.

The reactor pressure vessel baffle plate 45 is illustrated as being located between the top of the riser section 24 and a pressurizer region 40. The pressurizer region 40 is shown as comprising one or more heaters and a spray nozzle configured to control a pressure, or maintain a steam dome, within an upper end 56 or head of the reactor pressure vessel 52. Primary coolant 28 located below the reactor pressure vessel baffle plate 45 may comprise relatively sub-cooled coolant TSUB, whereas primary coolant 28 in the pressurizer region 40 in the upper end 56 of the reactor pressure vessel 52 may comprise substantially saturated coolant TSAT.

A fluid level of primary coolant 28 is shown as being above the reactor pressure vessel baffle plate 45, and within the pressurizer region 40, such that the entire volume between the reactor pressure vessel baffle plate 45 and the lower end 55 of the reactor pressure vessel 52 may be full of primary coolant 28 during normal operation of reactor module 5.

Shroud 22 may support one or more control rod guide tubes 94 that serve to guide control rod assemblies 80 that are inserted into, or removed from, reactor core 6. In some examples, drive shafts 20 may pass through reactor pressure vessel baffle plate 45 and through riser section 24 in order to control the position of control rod assemblies 80 relative to reactor core 6.

Reactor pressure vessel 52 may comprise a flange by which lower head 55 may be removably attached to an upper reactor vessel body 60 of reactor pressure vessel 52. In some examples, when lower head 55 is separated from upper reactor vessel body 60, such as during a refueling operation, riser section 24, baffle plate 45, and other internals may be retained within upper reactor vessel body 60, whereas reactor core 6 may be retained within lower head 55.

Additionally, upper reactor vessel body 60 may be housed within a containment vessel 70. Any air or other gases that reside in a containment region 74 located between containment vessel 70 and reactor pressure vessel 52 may be removed or voided prior to or during reactor startup. The gases that are voided or evacuated from the containment region 74 may comprise non-condensable gases and/or condensable gases. During an emergency operation, vapor and/or steam may be vented from reactor pressure vessel 52 into containment region 74, or only a negligible amount of non-condensable gas (such as hydrogen) may be vented or released into containment region 74.

Figure 2:
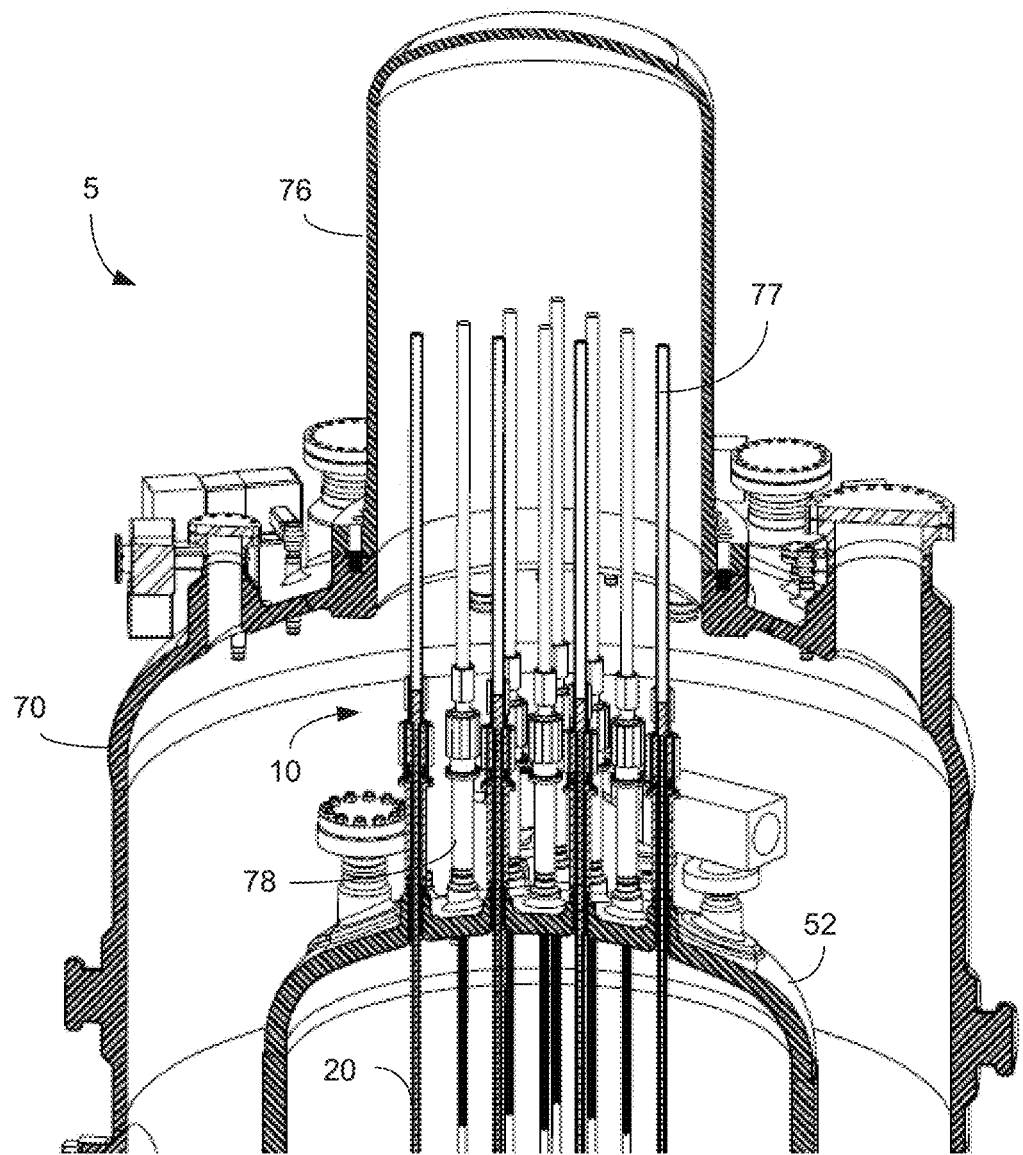
FIG. 2 is a perspective side sectional view of the upper head of a reactor pressure vessel with control rod drive mechanisms (CRDMs) inside a containment vessel.

FIG. 2 illustrates an upper cross-sectional view of reactor module 5 and example control rod drive mechanism (CRDM) assemblies 10. Reactor module 5 may comprise an upper containment vessel 76 housing at least a portion of the CRDM 10. A plurality of drive shaft housings 77 may be located within upper containment vessel 76. A plurality of drive shafts 20 associated with CRDMs 10 may be located in a reactor pressure vessel 52 that is housed in main containment vessel 70. Drive shaft housings 77 may be configured to house at least a portion of drive shafts 20 during operation of reactor module 5. In some examples, essentially all of the CRDMs 10 may be housed within main containment vessel 70.

Upper containment vessel 76 may be removably attached to main containment vessel 70. By removing upper containment vessel 76, the overall size and/or volume of reactor module 5 may be reduced, which may affect peak containment pressure and/or water levels. In addition to reducing the overall height of reactor module 5, the removal of upper containment vessel 76 from main containment vessel 70 may further reduce the weight and shipping height of reactor module 5. In some example reactor modules, several tons of weight may be removed for each foot that the overall height of reactor module 5 is decreased.

Reactor pressure vessel 52 and/or main containment vessel 70 may comprise one or more steel vessels. Additionally, main containment vessel 70 may comprise one or more flanges by which a top head or a bottom head of main containment vessel 70 may be removed from the containment vessel body, such as during a refueling operation.

During refueling, reactor module 5 may be relocated from an operating bay into a refueling bay, and a series of disassembly steps may be performed on the reactor module 5. The operating bay may be connected to the refueling bay by water, such that reactor module 5 is transported under water. Main containment vessel 70 may be disassembled, e.g., the top or bottom head may be separated from the containment vessel body, in order to gain access to CRDM 10 and/or to reactor pressure vessel 52. At this stage of refueling, reactor pressure vessel 52 may remain completely submerged in the surrounding water in the refueling bay. In some examples, an upper portion of CRDM 10, such as the plurality of drive shaft housings 77, may be located above water to facilitate access to CRDM 10 in a dry environment. In other examples, the entire CRDM 10 may be submerged in the pool of water in the refueling bay.

CRDMs 10 may be mounted to an upper head of reactor pressure vessel 52 by nozzles 78. Nozzles 78 may be configured to support CRDMs 10 when main containment vessel 70 is partially or completely disassembled during the refueling operation. Additionally, CRDMs 10 may be configured to support and/or control the position of drive shafts 20 within reactor pressure vessel 52.

Reactor pressure vessel 52 may comprise a substantially capsule-shaped vessel. In some examples, reactor pressure vessel 52 may be approximately 20 meters in height. Drive shafts 20 may extend from CRDMs 10, located at the upper head of reactor pressure vessel 52, into a lower head of reactor pressure vessel 52, so that they can be connected to control rod assemblies 80 that are inserted into reactor core 6 (FIG. 1). The distance from the upper head of reactor pressure vessel 52 to reactor core 6, while less than the overall height of reactor pressure vessel 52, may therefore result in the length of drive shafts 20 also being approximately 20 meters in length or, in some examples, somewhat less than the height of reactor pressure vessel 52.

Figure 3:
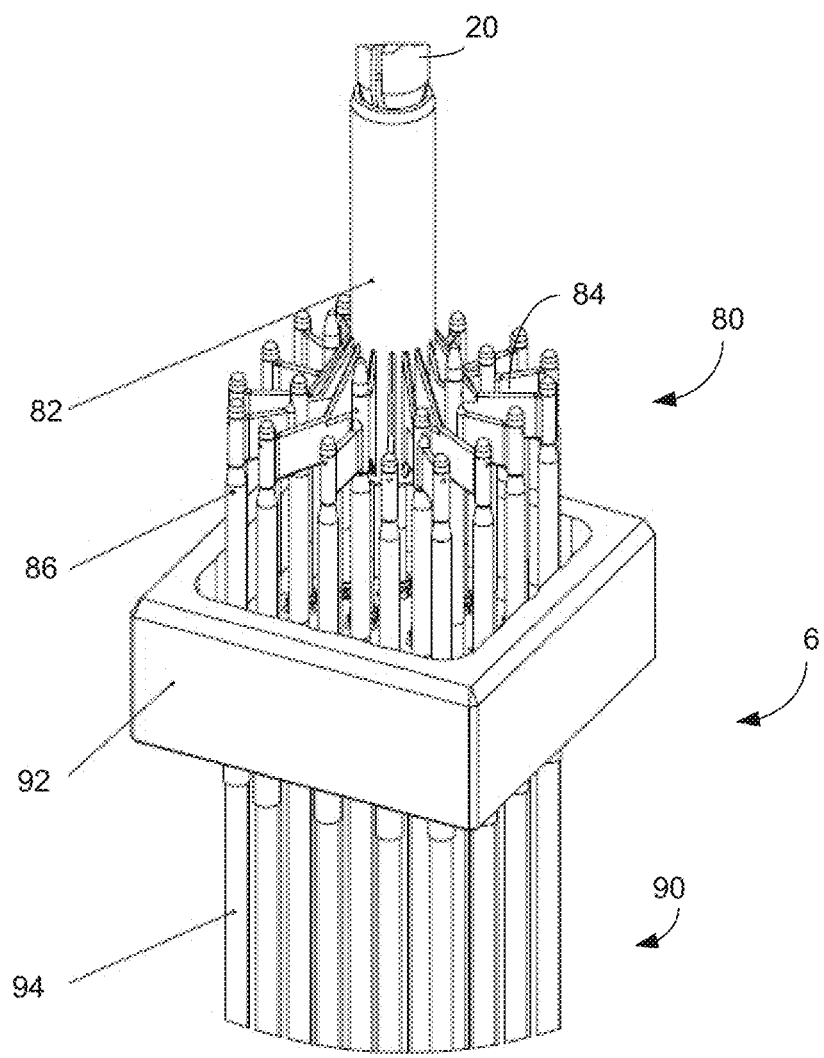
FIG. 3 is a perspective view of a control rod assembly partially inserted into a nuclear fuel assembly.

FIG. 3 is a perspective view of a control rod assembly 80 held partially above and partially inserted into a nuclear fuel assembly 90 in reactor core 6. As explained above, multiple drive shafts 20 extend down from rod drive mechanisms 10 to the top of reactor core 6. Control rod assembly 80 may include a cylindrical hub 82 that attaches to the bottom end of drive shaft 20. Arms 84 extend radially out from cylindrical hub 82 and attach at distal ends to top ends of control rods 86.

Control rods 86 extend into a nuclear fuel assembly 90 that is alternatively referred to as a fuel bundle that forms part of reactor core 6. Nuclear fuel assembly 90 may include a top nozzle 92 that supports multiple guide tubes 94. Guide tubes 94 extend down from nozzle 92 and in-between nuclear fuel rods (not shown). Control rods 86 control the fission rate of the uranium and plutonium in the nuclear fuel rods.

Control rods 86 are typically held by drive shaft 20 above nuclear fuel assembly 90 or held slightly inserted into nuclear fuel assembly 90. Reactor core 6 may overheat. A nuclear SCRAM operation is initiated where control CRDMs 10 in FIG. 1 release drive shafts 20 dropping control rods 86 down into guide tubes 94 and in-between the nuclear fuel rods.

FIG. 4A shows a cross-sectional view of an example reactor pressure vessel 52. CRDMs 10 may be mounted to an upper head 96 of reactor pressure vessel 52 and configured to support a plurality of drive shafts 20 that extend through the length of an upper reactor vessel body 60 of reactor pressure vessel 52 towards reactor core 6 located in a lower head 98 of reactor pressure vessel 52. In some examples, lower head 98 may be removably attached to upper reactor vessel body 60 at a flange 100, such as by a plurality of bolts.

In addition to housing a number of nuclear fuel rods, reactor core 6 may be configured to receive a plurality of control rod assemblies 80 that may be movably inserted between the fuel rods to control the power output of reactor core 6. When reactor core 6 is generating power, lower ends 102 of drive shafts 20 may be connected to control rod assemblies 80. Additionally, CRDMs 10 may be configured to control the location of control rod assemblies 80 within reactor core 6 by moving drive shafts 20 either up or down within reactor pressure vessel 52.

Upper ends 104 of drive shafts 20 may be housed in CRDM pressure housing 77 located above upper head 96 of reactor pressure vessel 52, such as when control rod assemblies 80 are removed from reactor core 6. In some examples, CRDM pressure housing 77 may comprise a single pressure vessel configured to house upper ends 104 of drive shafts 20. In other examples, CRDM pressure housing 77 may comprise individual housings for each of the drive shafts 20.

Lower ends 102 of drive shafts 20 are shown disconnected from control rod assemblies 80, such as may be associated with a refueling operation of reactor core 6. During an initial stage of the refueling operation, lower head 98 may remain attached to upper reactor vessel body 60 while drive shafts 20 are disconnected from control rod assemblies 80. Reactor pressure vessel 52 may remain completely sealed to the surrounding environment, which in some examples may comprise a pool of water that at least partially surrounds reactor pressure vessel 52, during the initial stage of the refueling operation.

CRDMs 10 may comprise remote disconnect mechanisms by which drive shafts 20 may be disconnected from control rod assemblies 80 without opening or otherwise disassembling reactor pressure vessel 52. In some examples, reactor pressure vessel 52 may form a sealed region 106 that surrounds reactor core 6, control rod assemblies 80, and lower ends 102 of drive shafts 20. By remotely disconnecting drive shafts 20, control rod assemblies 80 may remain within reactor core 6 when drive shafts 20 are withdrawn, at least partially, into CRDM pressure housing 77.

FIG. 4B illustrates the example reactor pressure vessel 52 of FIG. 4A partially disassembled. During the refueling operation, lower head 98 may be separated from upper reactor vessel body 60 of reactor pressure vessel 52. In some examples, lower head 98 may be held stationary in a refueling station while upper reactor vessel body 60 is lifted up by a crane and moved away from lower head 98 to facilitate access to reactor core 6.

Drive shafts 20 are shown in a retracted or withdrawn position, such that lower ends 102 may be completely retained within upper reactor vessel body 60 and/or CRDM pressure housing 77. For example, CRDMs 10 may be configured to raise lower ends 102 of drive shafts 20 above a lower flange 108 used to mount upper reactor vessel 60 together with an upper flange 110 of lower head 98. Withdrawing lower ends 102 of drive shafts 20 into upper reactor vessel body 60 may provide additional clearance between lower flange 108 and upper flange 110 during the refueling operation and further may keep drive shafts 20 from contacting external objects or getting damaged during transport and/or storage of upper reactor vessel body 60. Additionally, upper ends 104 of drive shafts 20 may similarly be housed and/or protected by CRDM pressure housing 77 when drive shafts 20 are in the retracted or withdrawn position.

As discussed above, control rod assemblies 80 may remain completely inserted in reactor core 6 during some or all of the refueling operation. In some examples, maintaining the insertion of control rod assemblies 80 within reactor core 6 may be dictated by nuclear regulatory and/or safety considerations.

Single-Hinge Type Control Rod Drive Mechanism

Figure 6:
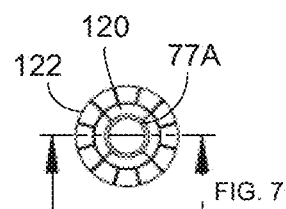
FIG. 6 is a plan view of the single-hinge type control rod drive mechanism.
Figure 5:
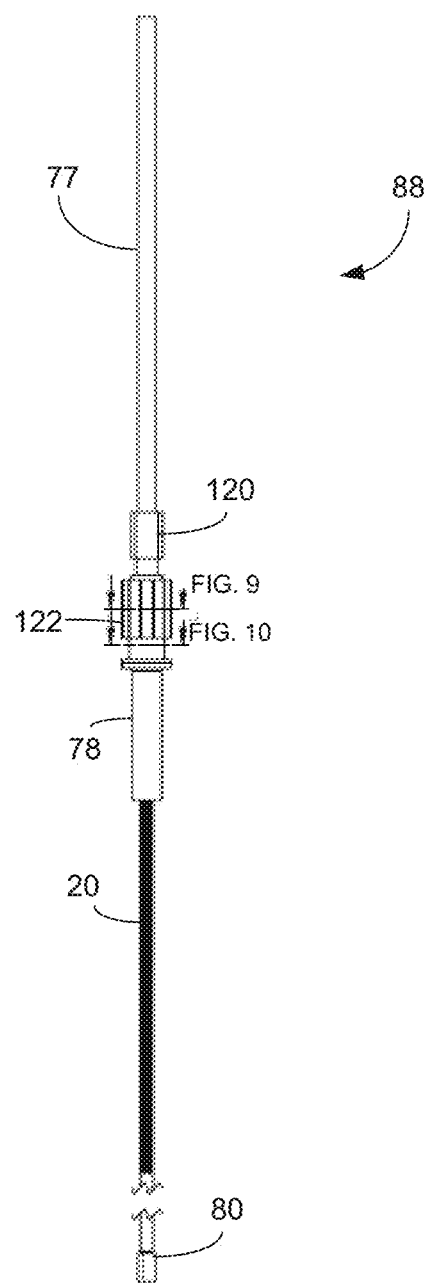
FIG. 5 is side view of a single-hinge type control rod drive mechanism.

FIG. 5 is a side view and FIG. 6 is a plan view of a single-hinge type control rod drive mechanism 88 that includes a remote disconnect mechanism. Referring to FIGS. 5 and 6, a drive shaft housing 77 extends over the top end of drive shaft 20 and around the latch mechanism 138. Drive shaft housing 77 is alternatively referred to as an upper pressure boundary.

As described above, drive shaft 20 enters reactor pressure vessel (RPV) 52 in FIG. 2 through a nozzle 78 connected on top to the bottom end of drive shaft housing 77. A bottom end of drive shaft 20 detachably connects to control rod assembly 80 as shown in more detail below.

Control rod drive mechanism 88 includes a drive assembly 122 that raises and lowers drive shaft 20 and attached control rod assembly 80. Control rod drive mechanism 88 also includes a disconnect assembly 120 that disconnects drive shaft 20 from control rod assembly 80. Both drive assembly 122 and disconnect assembly 120 may be remotely activated and controlled from outside of the RPV 52 via electrical control signals.

FIG. 7 is a side sectional view of control rod drive mechanism 88 and FIG. 8 is a more detailed sectional view of a single-hinge latch assembly 138 used in control rod drive mechanism 88. Referring to FIGS. 7 and 8, through-holes 158 are provided in drive shaft housing 77 and nozzle 78. Bolts (not shown) may be inserted into holes 158 to connect drive shaft housing 77 to nozzle 78 that extends up from the upper head of RPV 52 as shown above in FIG. 2.

A disconnect rod 132 extends through the entire length of drive shaft 20 and a cylindrical disconnect magnet 134 is attached to a top end of disconnect rod 132. Disconnect magnet 134 extends up into drive shaft housing 77 and annular disconnect coils 136 extend around drive shaft housing 77 and disconnect magnet 134. When activated, disconnect coils 136 may hold disconnect magnet 134 in a raised position allowing disconnect rod 132 to retract vertically upwards within drive shaft 20.

An upper end of drive shaft 20 includes a threaded outside surface 140. In one example, threads 140 may comprise ACME® type threads for linearly displacing drive shaft 20. Of course, any other type of threading or gearing also may be used. Drive shaft 20 extends from underneath disconnect magnet 134, through drive shaft housing 77 and nozzle 78, and into the upper head of RPV 52 (FIG. 1). Drive shaft 20 further extends through the length of RPV 52 and a bottom end includes a grapple 126 that connects to control rod assembly 80. Disconnect magnet 134 and disconnect coils 136 encompass the disconnect assembly 120.

An annular arrangement of drive coils 128 may extend around the outside of drive shaft housing 77 and an annular arrangement of drive magnets 130 inside of drive shaft housing 77 may extend around drive shaft 20. Continuously activating drive coils 128 may raise drive magnets 130. Alternating activation of alternating drive coils 128 in FIG. 8 also may rotate drive magnets 130 around a center axis 156 of drive shaft 20. Drive coils 128, drive magnets 130 and latch assembly 138 form the drive assembly 122.

A single-hinge latch assembly 138 is coupled on the bottom end to the drive shaft housing 77 and coupled on top to drive magnets 130. Latch assembly 138 includes an annular base 142 that includes a central opening that extends around drive shaft 20. A lip 143 extends out from an outside bottom end of base 142 and seats into a recess formed between the bottom end of drive shaft housing 77 and the top end of nozzle 78. Lip 143 functions as a hold-down holding base 142 down against the top surface of nozzle 78.

An annular collar 148 is rotationally attached to base 142 and includes a step 144 that attaches on top of bearings 154 that extend around the top of base 142. Collar 146 also includes a center opening that receives and extends around drive shaft 20. Collar 146 is held vertically/elevationally down onto base 142 but rotates about central axis 156 of drive shaft 20 on top of bearings 154 and base 142.

The outside end of a gripper 150 is pivotally attached to an upper end of collar 148 with a first pin 152A. The inside end of gripper 150 is pivotally attached to a bottom end of a latch 146 by a second pin 152B. A top end of latch 146 is attached to drive magnets 130. When drive magnets 130 are lowered a bottom end of latch 146 may sit on top of step 144 of collar 148.

When activated, drive coils 128 lift drive magnets 130 vertically upwards also lifting latch 146. Lifting latch 146 causes the inside ends of grippers 150 to rotate upwards engaging with threads 140 on drive shaft 20. The outside ends of grippers 150 rotate about pins 152A which are held vertically in place by collar 148.

After raising the inside ends of grippers 150, drive coils 128 may start rotating drive magnets 130 about central axis 156 of drive shaft 20. The bottom ends of drive magnets 130 start rotating raised latch 146 and attached gripper 150 around the outside circumference of drive shaft 20. Rotating gripper 150 also rotates collar 148 over the top of base 142 and around central axis 156 while remaining elevationally held down in place by base 142.

The inside end of grippers 150 rotate within threads 140 moving drive shaft 20 axially and linearly upwards inside of drive shaft housing 77 and nozzle 78. Drive coils 128 may rotate drive magnets 130 in an opposite direction, also rotating attached grippers 150 within threads 140 in an opposite direction. Accordingly, grippers 150 axially and linearly move drive shaft 20 in an upward or downward direction as directed by an electrical control system.

Deactivating drive coils 128 drops drive magnets 130 vertically downwards. Inside ends of grippers 150 also rotate downwards about pins 152B, disengaging from threads 140. Now released from grippers 150, drive shaft 20 is free to drop vertically downwards via gravity.

Figure 9:
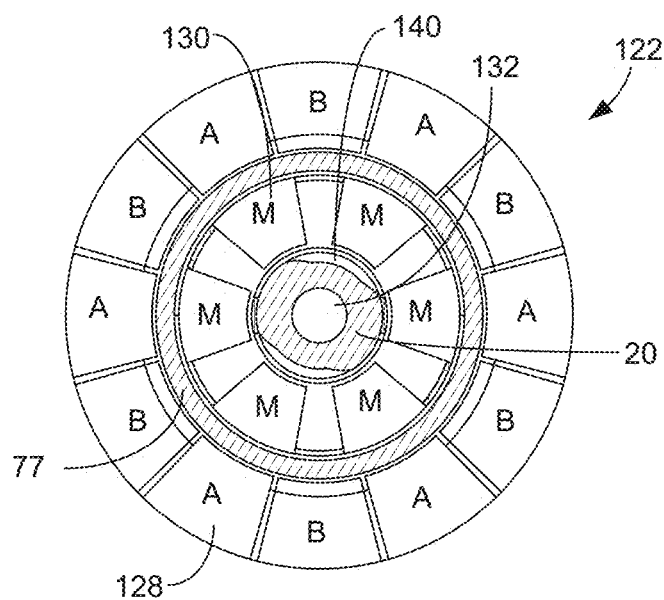
FIG. 9 is a cross-sectional plan view of a drive assembly.

FIG. 9 is a cross-sectional plan view of drive assembly 122. Annular drive coils 128 extend around the outside of drive shaft housing 77 and annular drive magnets 130 extend around the inside of drive shaft housing 77. Drive shaft 20 extends through a central opening formed in drive magnets 130 and disconnect rod 132 extends through a hole formed along the central axis of drive shaft 20. Threads 140 extend around the outside surface of drive shaft 20.

When continuously activated, drive coils 128 generate an electromagnetic field that vertically lifts up drive magnets 130. When drive coils 128 are activated in an alternating pattern, the electromagnetic field also rotates drive magnets 130 around the central axis causing drive assembly 122 to operate effectively like an electrical motor. For example, the electrical control system may activate drive coils A during a first period and activate drive coils B during an alternating second period. The alternating activation of drive coils A and B cause drive magnets M to rotate about a vertical axis that extends through drive shaft 20.

Figure 10:
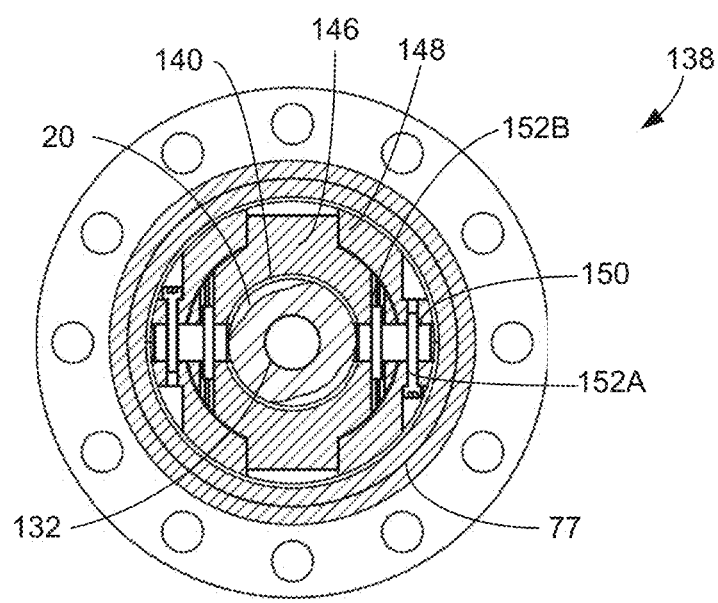
FIG. 10 is a cross-sectional plan view of the single-hinge latch assembly in FIG. 8.

FIG. 10 is a cross-sectional plan view of single-hinge latch assembly 138. Disconnect rod 132 extends through the center of drive shaft 20. Threads 140 extend around the outside surface of drive shaft 20. Latch 146 has an annular cross-sectional shape and attaches to the inside end of gripper 150 via pin 152B. Collar 148 also includes an annular cross-sectional shape and attached to the outside end of gripper 150 via pin 152A. As explained above, latch 146 is attached to drive magnets 130 and can move vertically up and down. Drive shaft housing 77 also has an annular cross-sectional shape concentrically aligned with drive shaft 20. Also note that any number of grippers 150 may be located around drive shaft 20. For example, four grippers 150 may be located 90 degrees apart around drive shaft 20.

Figure 11A:
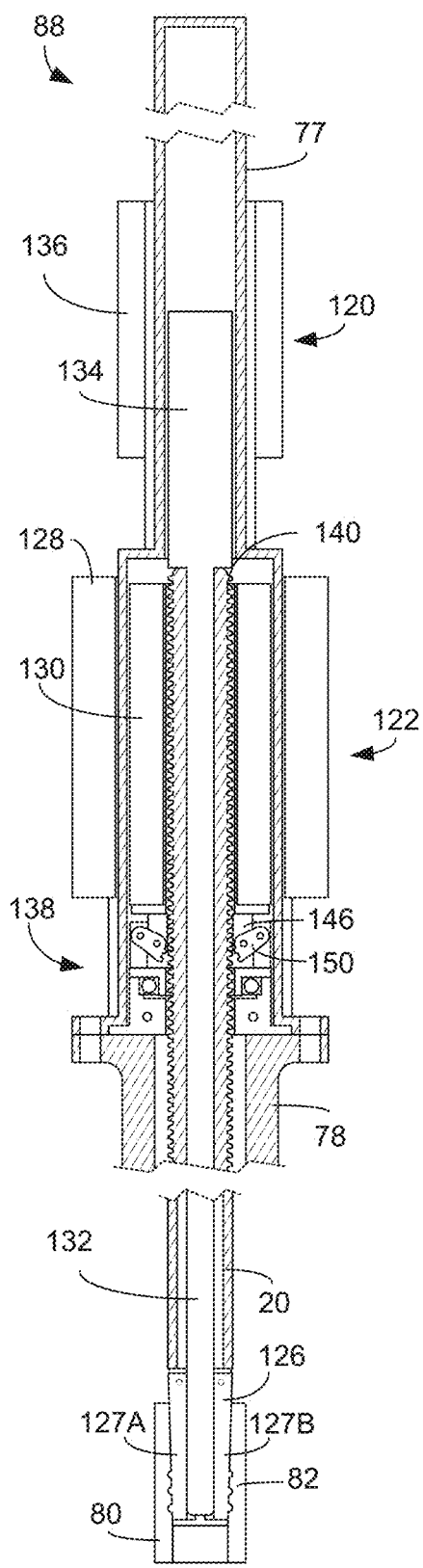

FIGS. 11A-11E are side sectional views showing different operating positions of control rod drive mechanism 88. Referring to FIG. 11A, drive assembly 122 is shown in a lowered state. Drive coils 128 are deactivated and drive magnets 130 are in a lowered position, with the control rod assembly 80 fully inserted into reactor core 6 (FIG. 1). Lowered drive magnets 130 with attached latch 146 released grippers 150 from threads 140 of drive shaft 20.

During a loss of electric power or forced SCRAM, drive coils 128 may deactivate, allowing gravity to drop drive shaft 20 downward, disconnected from latch assembly 138. Attached control rod assembly 80 accordingly drops into fuel assembly 90 neutralizing reactor core 6 (see FIGS. 1 and 3). Thus, CRDM 88 has the advantage of automatically scramming reactor core 6 whenever deactivated during a power failure.

Disconnect assembly 120 is also shown in a lowered state. Disconnect coils 136 are deactivated and disconnect magnet 134 is in a lowered position sitting on top of drive shaft 20. In the lowered position, the bottom end of disconnect rod 132 extends in-between reciprocating arms 127A and 127B of grapple 126. Spread-apart grapple arms 127A and 127B press against and lock into grooves in cylindrical hub 82 of control rod assembly 80.

Figure 11B:
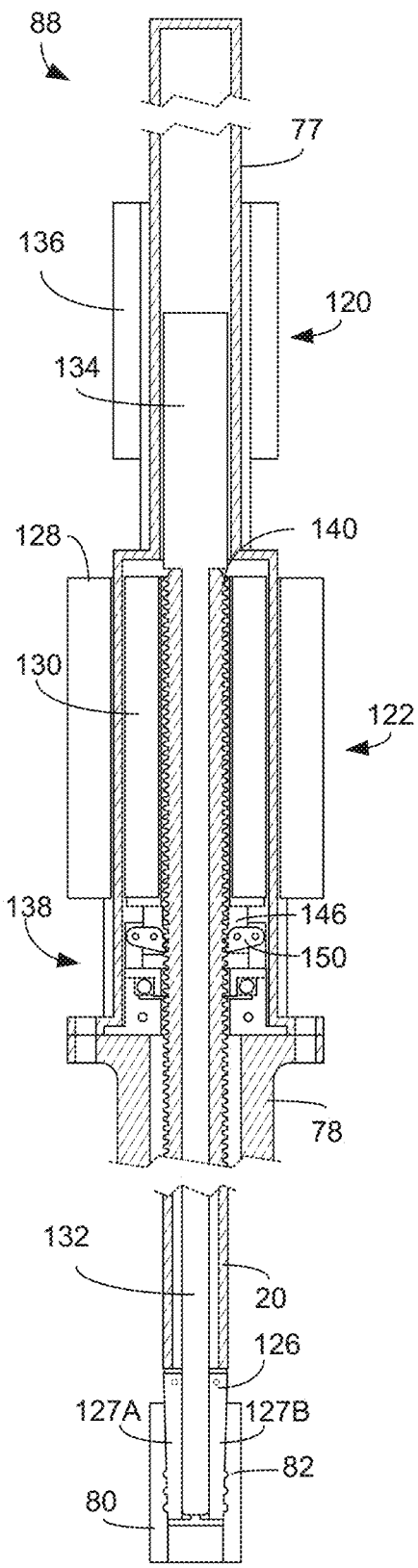

FIG. 11B shows drive assembly 122 in a raised state. Drive coils 128 are activated and drive magnets 130 are in a raised position. Raised drive magnets 130 raise attached latch 146 moving inside ends of grippers 150 upward, interlocking with threads 140 of drive shaft 20. Locked grippers 150 can raise or lower drive shaft 20 based on the rotational direction of drive magnets 130.

Disconnect assembly 120 is still shown in a lowered state where the bottom end of disconnect rod 132 remains inserted in-between grapple arms 127A and 127B. Spread-apart grapple arms 127A and 127B remain locked inside of cylindrical hub 82 locking the bottom end of drive shaft 20 to control rod assembly 80.

FIG. 11C shows drive assembly 122 in a raised state. Drive coils 128 are activated and drive magnets 130 are raised, moving attached latch 146 upward engaging inside ends of grippers 150 with threads 140. Drive coils 128 also may start rotating drive magnets 130 causing grippers 150 to rotate around engaged threads 140 of drive shaft 20. Rotating grippers 150 force drive shaft 20 axially and linearly upwards into drive shaft housing 77 and lift connected control rod assembly 80 by a short distance that does not cause a reactivity insertion into the reactor core (within a so-called dead band).

Raising drive shaft 20 also raises disconnect magnet 134, maintaining the bottom end of attached disconnect rod 132 in-between grapple arms 127A and 127B. In other words, raising drive shaft 20 and disconnect rod 132 together keeps the bottom end of drive shaft 20 attached to control rod drive mechanism 80, prior to the disconnection discussed below.

FIG. 11D shows drive assembly 122 in a lowered state and disconnect assembly 120 in a raised state. Disconnect coils 136 are activated when drive shaft 20 and disconnect magnet 134 are in the raised position shown in FIG. 11C. Drive coils 128 then may rotate drive magnets 130 in an opposite direction lowering drive shaft 20 vertically downward. At the same time, disconnect coils 136 hold disconnect magnet 134 in a raised position. As grippers 150 continue to move drive shaft 20 linearly downward, the bottom end of disconnect rod 132 slides up and out from in-between grapple 126. Grapple arms 127A and 127B accordingly reciprocate inwards disconnecting from control rod assembly 80, which drops a short distance. Alternatively, drive coils 128 are deactivated dropping drive shaft 20 and disconnecting control rod assembly 80, with disconnect coils 136 holding disconnect magnet 134 in a raised position.

Figure 11E:
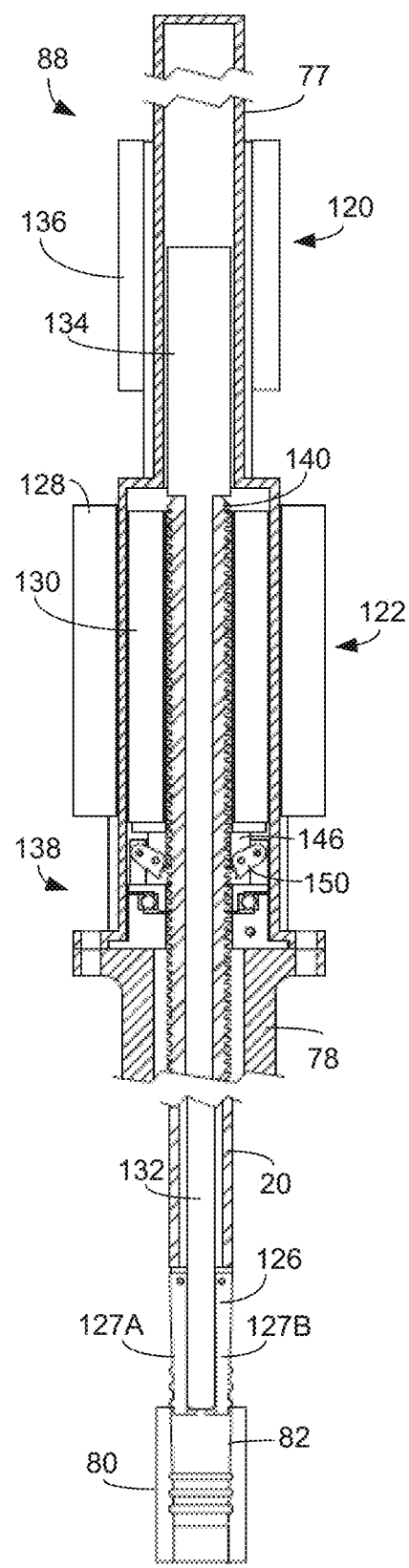

FIG. 11E shows disconnect assembly 120 and drive assembly 122 both in a lowered state. Deactivating disconnect coils 136 releases disconnect magnet 134 causing the bottom end of disconnect rod 132 to slide in-between grapple arms 127A and 127B. Drive coils 128 then may deactivate disconnecting grippers 150 from drive shaft 20. Spread-apart grapple 126 then sits on the top of control rod assembly 80.

Thus, drive coils 128 and disconnect coils 136 can be remotely activated and deactivated to linearly displace drive shaft 20 and also to disconnect drive shaft 20 from control rod assembly 80 during a reactor core refueling operation. Reconnecting the control rod assembly 80 after completion of refueling and re-assembly of reactor vessel 52 (FIGS. 4A and 4B) may be performed in reverse order of the steps shown in FIG. 11A to 11D.

Dual-Hinge Type Control Rod Drive Mechanism

Figure 12:
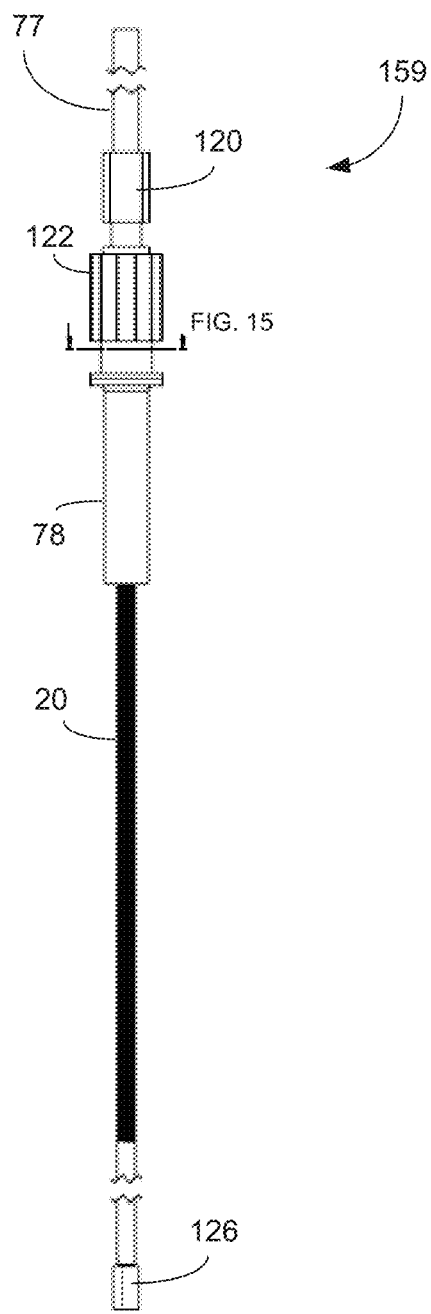
FIG. 12 is side view of a dual-hinge type control rod drive mechanism.
Figure 13A:
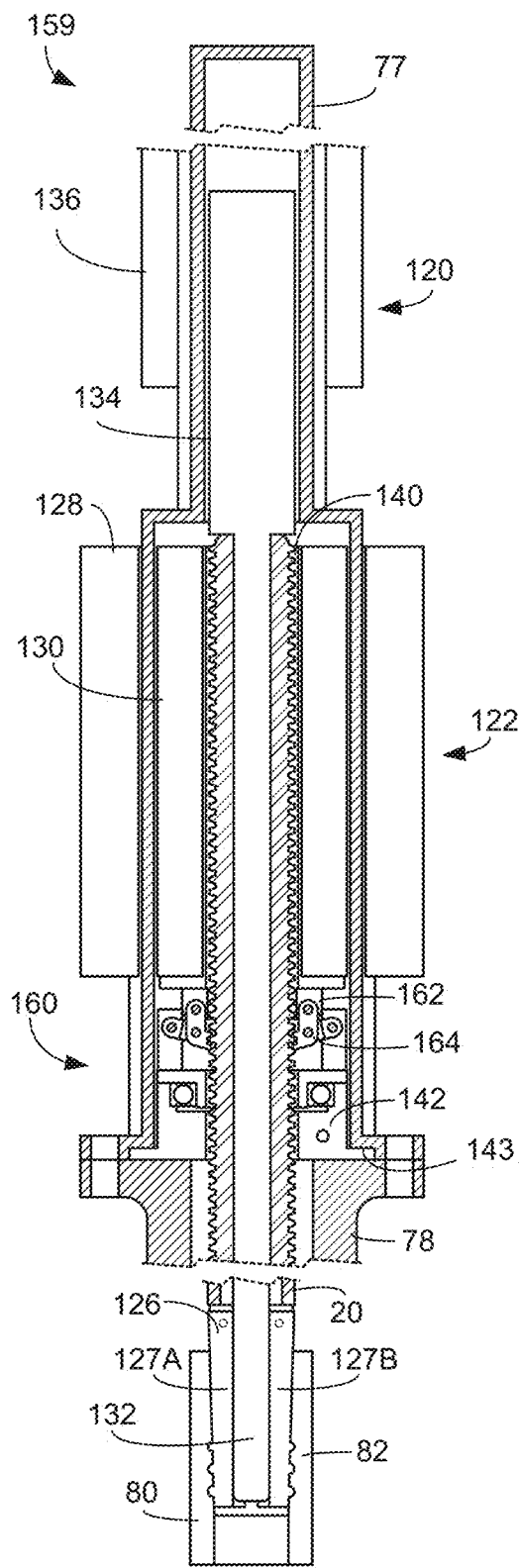
FIGS. 13A and 13B show side sectional views of the dual-hinge type control rod drive mechanism of FIG. 12 in different operating states.
Figure 13B:
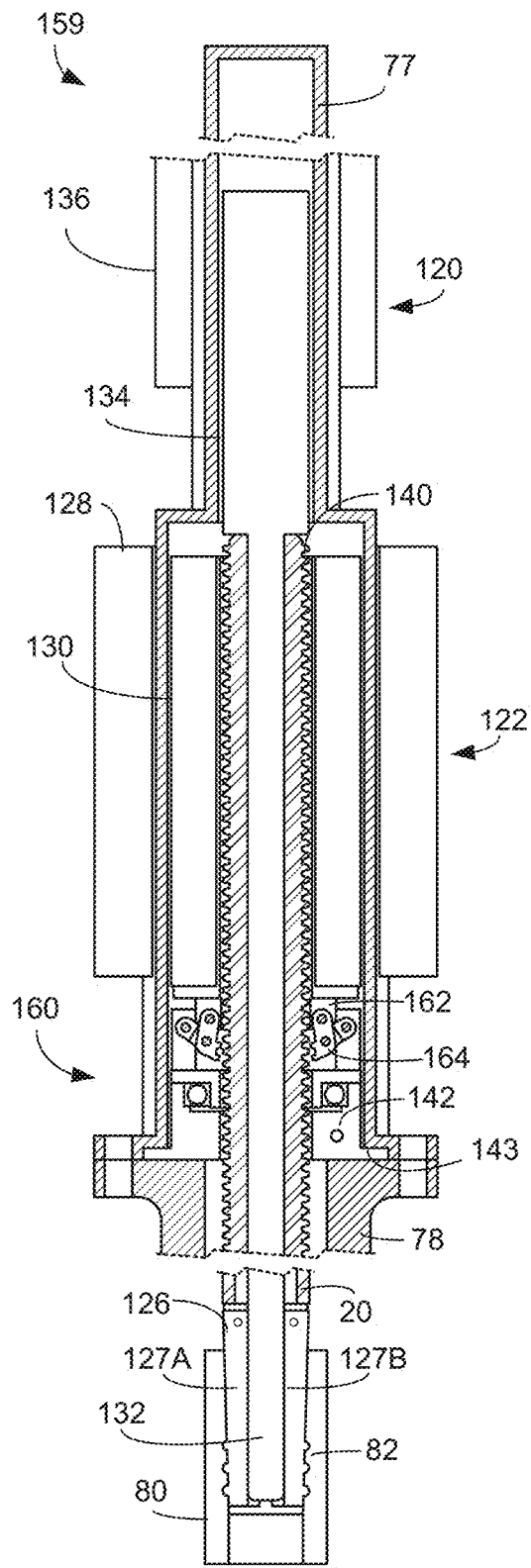
Figure 14:
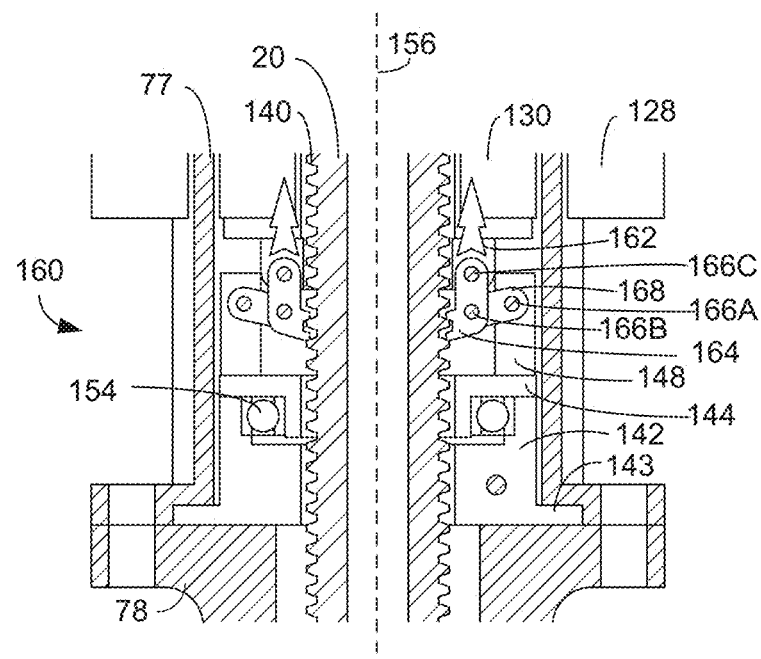
FIG. 14 is an enlarged side sectional view of a dual-hinge latch assembly within the control rod drive mechanism of FIG. 12.

FIG. 12 is a side view of a dual-hinge type control rod drive mechanism 159. FIGS. 13A and 13B are side sectional views of control rod drive mechanism 159. FIG. 14 is a more detailed view of the dual-hinge latch assembly 160.

Referring to FIGS. 12, 13A, 13B, and 14, drive assembly 122 and disconnect assembly 120 in control rod drive mechanism 159 include substantially the same drive and disconnect coils and magnets as described above. Drive shaft housing 77 and nozzle 78 are also all substantially the same as those described above. Disconnect rod 132, drive shaft 20, and threaded outside surface 140 are also similar to those described above.

Similar to above, continuously activating drive coils 128 may raise and align drive magnets 130 with annular drive coils 128. Alternating activation of adjacent drive coils 128 also may rotate drive magnets 130 around a central axis 156 of drive shaft 20, to force linear motion of drive shaft 20 and attached control rod assembly 80.

Dual-hinge latch assembly 160 is coupled at a bottom end to drive shaft housing 77 and coupled at a top end to drive magnets 130. Latch assembly 160 includes a similar base 142 at described above that includes a central opening that extends around drive shaft 20. A similar lip 143 extends out from an outside bottom end of base 142 and seats into a recess formed between the bottom end of drive shaft housing 77 and the top end of nozzle 78. Lip 143 functions as a hold-down holding base 142 down against a top surface of nozzle 78.

Referring to FIG. 13A, drive assembly 122 is shown in a raised state. Activating drive coils 128 raises drive magnets 130 and attached latch 162. The lower ends of grippers 164 move upwards and inwards engaging with threads 140 of drive shaft 20. Locked grippers 164 can then raise or lower drive shaft 20 based on the rotational direction of drive magnets 130.

Disconnect assembly 120 is shown in a lowered position where the bottom end of disconnect rod 132 is inserted in-between arms 127A and 127B of grapple 126. Spread-apart arms 127A and 127B lock inside of cylindrical hub 82 locking the bottom end of drive shaft 20 to control rod assembly 80.

Referring to FIG. 13B, drive assembly 122 and disconnect assembly 120 are shown in lowered states. Deactivating drive coils 128 lowers drive magnets 130 and attached latch 162. The grippers 164 move downwards and outwards disengaging with threads 140 of drive shaft 20.

Disconnect assembly 120 is still shown deactivated where the bottom end of disconnect rod 132 remains inserted in-between arms 127A and 127B of grapple 126. Spread-apart arms 127A and 127B remain locked inside of cylindrical hub 82 locking the bottom end of drive shaft 20 to control rod assembly 80.

In FIG. 14 an annular collar 148 similar in design to FIG. 8 is attached, but rotationally de-coupled, to base 142 and includes a similar step 144 that attaches on top of bearings 154 that extend around the top of base 142. Collar 146 also includes a center opening that receives and extends around drive shaft 20. Collar 146 is held vertically/elevationally down onto base 142 but rotates about central axis 156 of drive shaft 20 on top of bearings 154 and base 142.

The outside end of a hinge 168 is pivotally attached to a top end of collar 148 with a first pin 166A. The inside end of hinge 168 is pivotally attached to a lower end of a gripper 164 by a second pin 166B. The top end of a latch 162 is attached to drive magnet 130 and a bottom end of latch 162 is pivotally attached to a top end of gripper 164 by a third pin 166C.

When activated, drive coils 128 lift drive magnets 130 vertically upwards also raising latch 162. Gripper 164 and the inside end of hinge 168 also move upwards, moving the bottom end of gripper 164 inwards engaging with threads 140 of drive shaft 20.

After engaging the lower ends of grippers 164, drive coils 128 may start rotating drive magnets 130 about central axis 156 of drive shaft 20. The bottom ends of drive magnets 130 also start rotating raised latch 146 and engaged grippers 164 around drive shaft 20. Rotating grippers 164 also rotates collar 148 about central axis 156 while being held vertically down by base 142.

The inside ends of grippers 164 rotate within engaged threads 140 moving drive shaft 20 linearly upwards inside of drive shaft housing 77 and nozzle 78. Drive coils 128 may rotate drive magnets 130 in an opposite direction, thus rotating grippers 164 within threads 140 in an opposite direction axially moving drive shaft 20 downward.

Deactivating drive coils 128 drops drive magnets 130 and inside ends of grippers 164 downwards. Hinges 168 also rotate downwards and outwards disengaging the lower ends of grippers 164 from threads 140. Drive shaft 20 is now released from grippers 150 and is free to drop vertically downwards via gravity.

Figure 15:
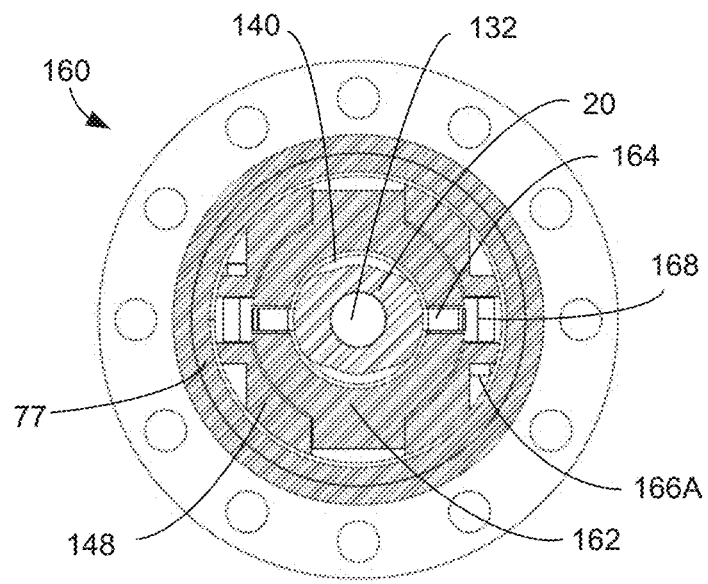
FIG. 15 is a cross-sectional plan view of the dual-hinge latch assembly of FIG. 14.

FIG. 15 is a cross-sectional plan view of dual-hinge latch assembly 160. Disconnect rod 132 extends through a centerline of drive shaft 20. Threads 140 extend around the outside surface of drive shaft 20. Latch 162 has an annular cross-sectional shape and attaches at the bottom end to the top end of gripper 164. Collar 148 also includes an annular cross-sectional shape and attaches to the outside end of hinge 168 via pin 166A. As explained above, collar 146 is attached to drive magnets 130 and can move vertically up and down. Drive shaft housing 77 also has an annular cross-sectional shape concentrically aligned with drive shaft 20.

FIGS. 16A-16G are simplified schematic diagrams showing different operations of the single-hinge type control rod drive mechanism 88 or double-hinge type control rod drive mechanism 159 described above, focusing on the primary elements to attain the CRDM functions described herein. For explanation purposes, the following abbreviations are used below.

Drive coils 128=A
Drive magnet 130=B
Latch 146, 162=C
Drive shaft 20=D
Grippers 150, 164=E
Disconnect coil 136=F
Disconnect magnet 134=G
Grapple 126=H
Drive shaft housing 77=I
Base 142=J
Disconnect rod 132=K
Control rod assembly 80=CRA Concentric electromagnetic coils A and F extend on the outside of drive shaft housing I, alternatively referred to as pressure boundary. Coils A and F on the outside interact to move cylindrical magnets B and G, respectively, inside pressure boundary I.

Figure 16C:
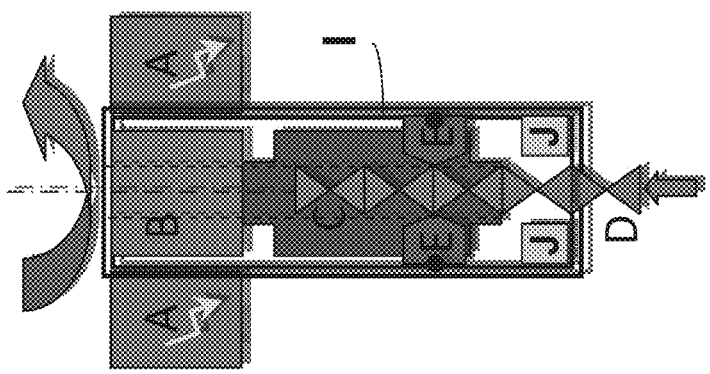
Figure 16B:
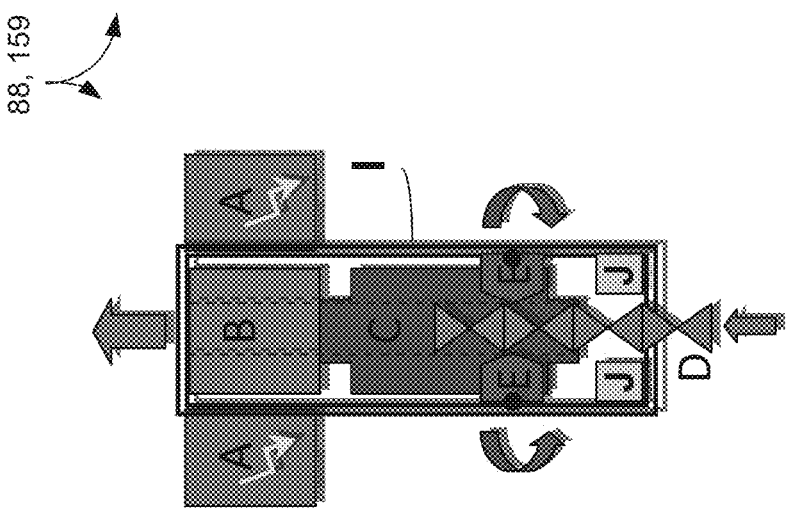
Figure 16A:
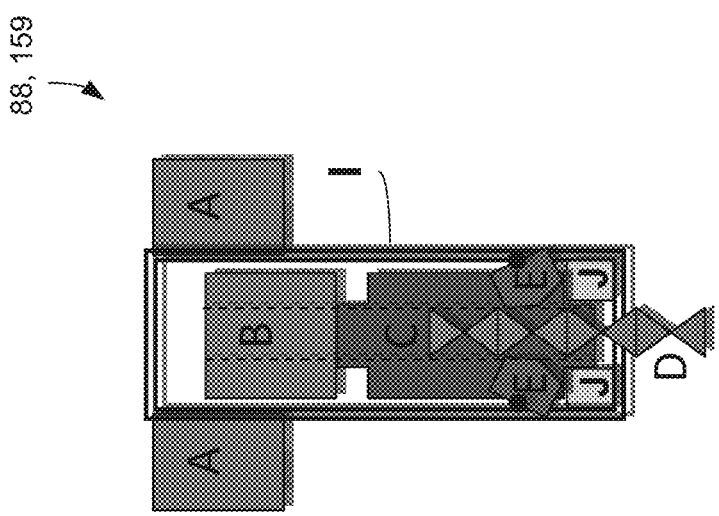

Referring to FIG. 16A, drive coils A are initially de-energized. Latch C is fixed to annular drive magnets B and rests on base J inside drive shaft housing I.

Referring to FIG. 16B, drive coils A are energized, lifting drive magnet B upwards until aligned with drive coils A. This lifts latch C and engages grippers E that pivot around pins that are vertically fixed with respect to the inside of pressure boundary I, yet allow for rotation of latch C. Grippers E fit into threaded grooves of drive shaft D.

Referring to FIG. 16C, by operating drive coils A in a specific sequence, drive magnet B and latch C are set into rotary motion, while at the same time still maintaining a same elevation as drive coils A. This precludes disengagement of grippers E. The rotary motion of grippers E translates into linear drive shaft motion that raises drive rod D and the attached CRA.

Referring back to FIG. 16A, upon a SCRAM signal or loss of electric power, drive coils A release drive magnet B causing grippers E to pivot down and outwards due to the drop of latch C. This provides a safety feature where a gravity-driven drop of drive shaft D drops attached CRA into the reactor core.

FIGS. 16D-16G show how to remotely disconnect drive shaft D from the CRA prior to disassembly of reactor pressure vessel 52 in FIGS. 4A and 4B. Drive coils A are initially de-energized and latch C is resting on base J. This may be similar to the initial drive shaft engagement configuration shown in FIG. 16A.

Referring to FIG. 16D, drive coils A are activated raising drive magnets B and latch C causing grippers E to engage with drive shaft D. As shown above in FIG. 11C, drive coils A then set drive magnet B and latch C into rotary motion, while at the same time maintaining a same elevation as drive coils A. Rotating grippers E move drive shaft D and disconnect magnet G linearly upwards into raised positions, lifting the attached CRA by a short distance that does not cause a reactivity insertion into the reactor core (within a so-called dead band).

Referring to FIG. 16E, drive coils A are still energized holding drive magnet B, drive shaft D, disconnect magnet G, and disconnect rod K in raised positions. Disconnect coil F is energized holding disconnect magnet G and attached disconnect rod K vertically in place. Drive coils A then may rotate drive magnet B, latch C, and gripper E in an opposite direction linearly lowering drive shaft D. Grapple H on the bottom end of drive shaft D currently holds the CRA, and the bottom end of disconnect rod K starts moving up and out from the grapple arms. The arms of grapple H contract causing the CRA to drop by a short distance, until it rests again on top of the nuclear fuel assembly top nozzle 92 in FIG. 3.

Referring to FIG. 16F, drive coils A remain energized and therefore hold drive magnet B in place. Disconnect coil F is then de-energized. This releases disconnect magnet G causing the bottom end of disconnect rod K to insert into and expand grapple H on the bottom of drive shaft D.

Referring to FIG. 16G, drive coils A are de-energized releasing annular drive magnet B and latch C. Drive shaft D drops by a short distance until grapple H rests on top of the CRA cylindrical hub without being engaged. This allows the upper and lower sections of the reactor pressure vessel to be separated for refueling without removing the CRA.

Re-connection of grapple H to the CRA is performed in reverse order. Drive coils A may move drive shaft D and disconnect magnet G vertically up into raised positions. Disconnect coils F may activate holding disconnect magnet G and disconnect rod K in the raised position. Drive coils A then may lower drive shaft D contracting and inserting grapple H into the CRA. Disconnect coils F then may be deactivated dropping disconnect magnet G and the bottom of disconnect rod K in-between grapple H. Grapple H expands locking into the CRA.

Alternatively, grapple H is reengaged with the CRA by pulling up disconnect magnet G using the electromagnetic force of disconnect coil F. Disconnect magnet G is moved into the raised position without simultaneously energizing drive coil A. The weight of drive shaft D may be large enough so that only disconnect rod K moves upwards inside of drive shaft D. Grapple H contracts inserting into the CRA cylindrical hub. Disconnect coils F are then deactivated so the bottom of disconnect rod K drops back down into grapple H. Grapple H expands locking into the CRA.

CRDM Cooling System

Figure 17:
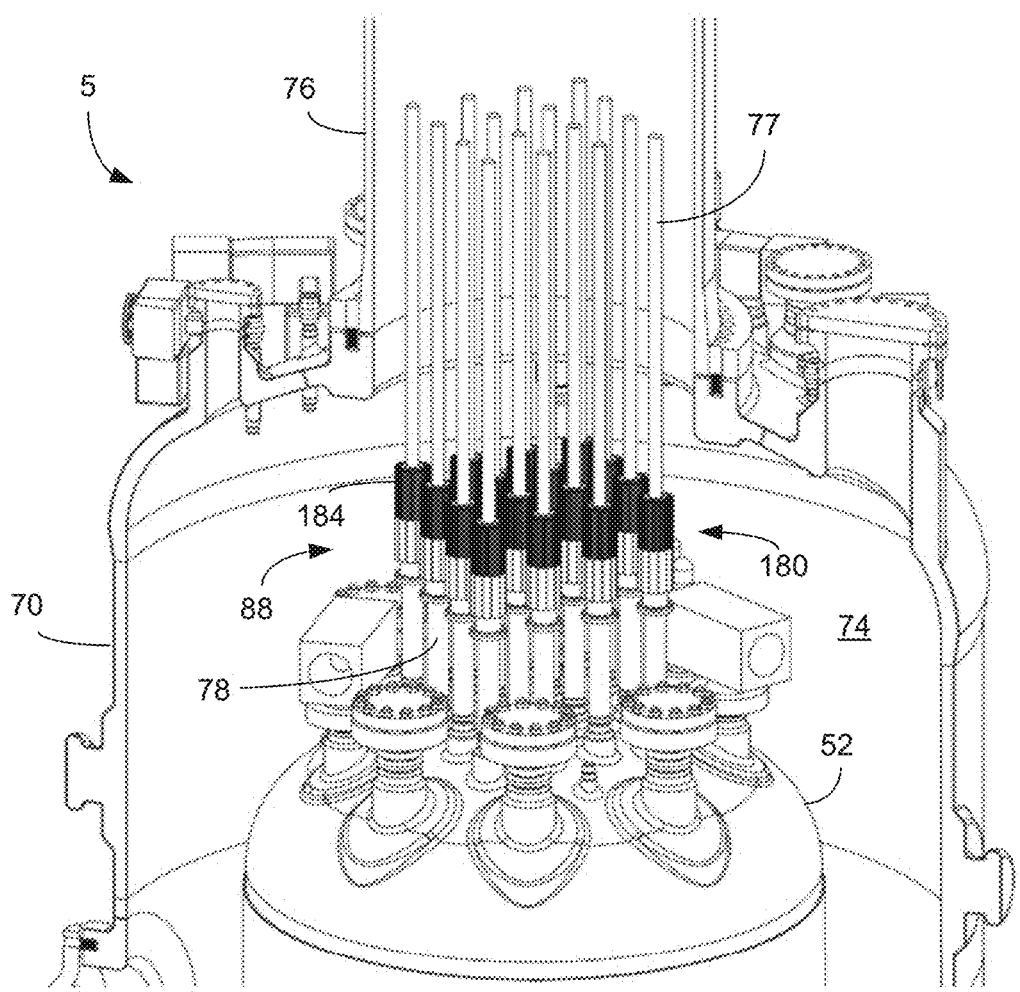
FIG. 17 is a perspective side sectional view of the upper head of a reactor pressure vessel within an upper containment vessel that uses a CRDM cooling system.
Figure 18:
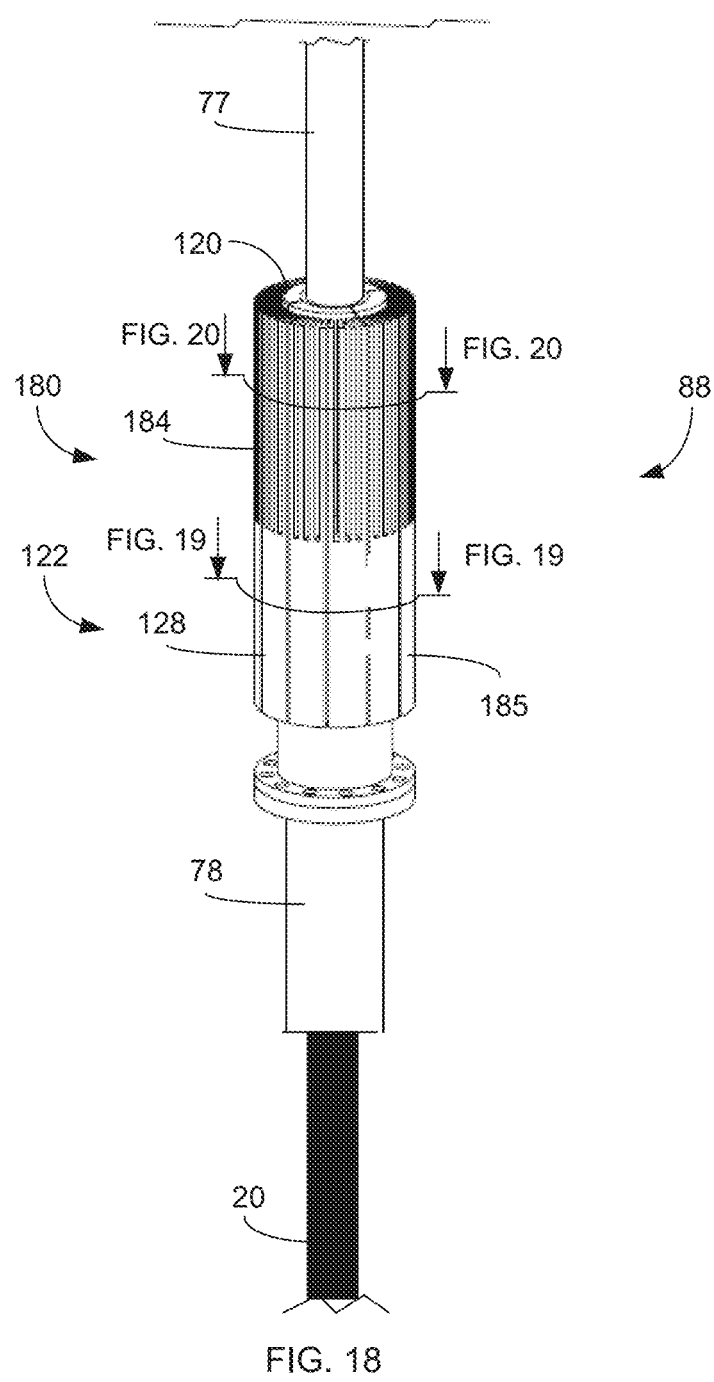
FIG. 18 is an isolated perspective view of the CRDM cooling system.

FIG. 17 illustrates an upper cross-sectional view of reactor module 5 with an example control rod drive mechanism (CRDM) 88 with an integrated cooling system 180. FIG. 18 is a isometric perspective view showing CRDM 88 and cooling system 180 in further detail. Reactor module 5 includes the same upper containment vessel 76 housing described above. A plurality of drive shaft housings 77 are located within upper containment vessel 76. As also described above, a plurality of drive shafts 20 extend down into RPV 52 through nozzles 78 connected on top to the bottom end of drive shaft housing 77.

Drive shaft housings 77 may retain any of the CRDM 88, disconnect assembly 120, drive assembly 122, single-hinge latch assembly 138, or double-hinge type control rod drive mechanism 159 described above. As explained above, drive assembly 122 may raise and lower drive shaft 20 and disconnect assembly 120 may disconnect drive shaft 20 from control rod assembly 80 (FIG. 3). Both drive assembly 122 and disconnect assembly 120 may be remotely activated and controlled from outside of RPV 52 via electrical control signals.

As also mentioned above, any air or other gases that reside in containment region 74 located between containment vessel 70 and reactor pressure vessel 52 may be removed or voided prior to or during reactor startup. The gases that are voided or evacuated from the containment region 74 may comprise non-condensable gases and/or condensable gases.

Cooling system 180 includes a set of heat fins 184 that extend up from the top of drive coils 128 and around disconnect assembly 120. Heat fins 184 may have a tabular shape and may be formed from any heat sink material, such as aluminum, copper, stainless steel, or any other heat conducting metal. Heat fins 184 have an improved path for radiative heat transfer to the CNV surfaces with cooler temperatures within containment region 74 formed between RPV 52 and CNV 70. Heat fins 184 may remove heat generated by drive coils 128 without substantially increasing the footprint of CRDM 88.

In one example, heat fins 184 may be attached or formed with an outside metal enclosure 185 that retains drive coils 128. For example, drive coils 128 and heat fins 184 may be formed into a same modular annular enclosure that can slide over drive shaft housing 77.

Figure 19:
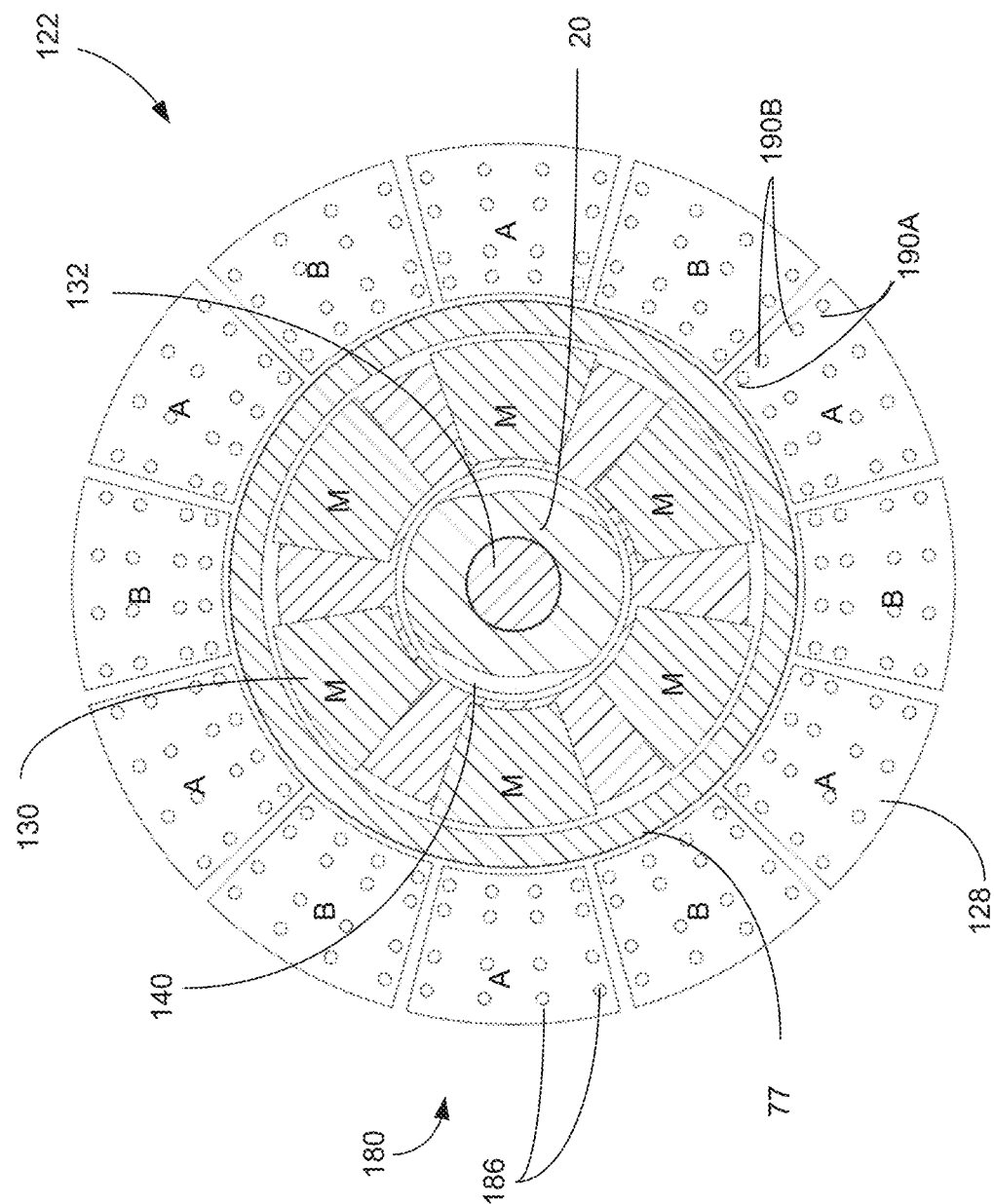
FIG. 19 is a cross-sectional plan view of a lower section of the CRDM cooling system.

FIG. 19 is a cross-sectional plan view of a lower portion of CRDM cooling system 180. As described above in FIG. 9, annular drive coils 128 extend around the outside circumference of drive shaft housing 77 and annular drive magnets 130 extend around the inside of drive shaft housing 77. Drive shaft 20 extends through a central opening formed in drive magnets 130 and disconnect rod 132 extends through a hole formed along the central axis of drive shaft 20. Threads 140 extend around the outside surface of drive shaft 20.

Cooling channels 186 extend vertically through and/or in-between drive coils 128 and either form or retain heat pipes 190. For example, channels 186 may retain metal tubes that retain a fluid that together operate as a heat pipe 190. In this example, four pairs of outer heat pipes 190A and inner heat pipes 190B extend in a half-loop through each drive coil 128. Outer heat pipes 190A and inner heat pipes 190B are alternatively referred to as heat pipes 190.

Figure 20:
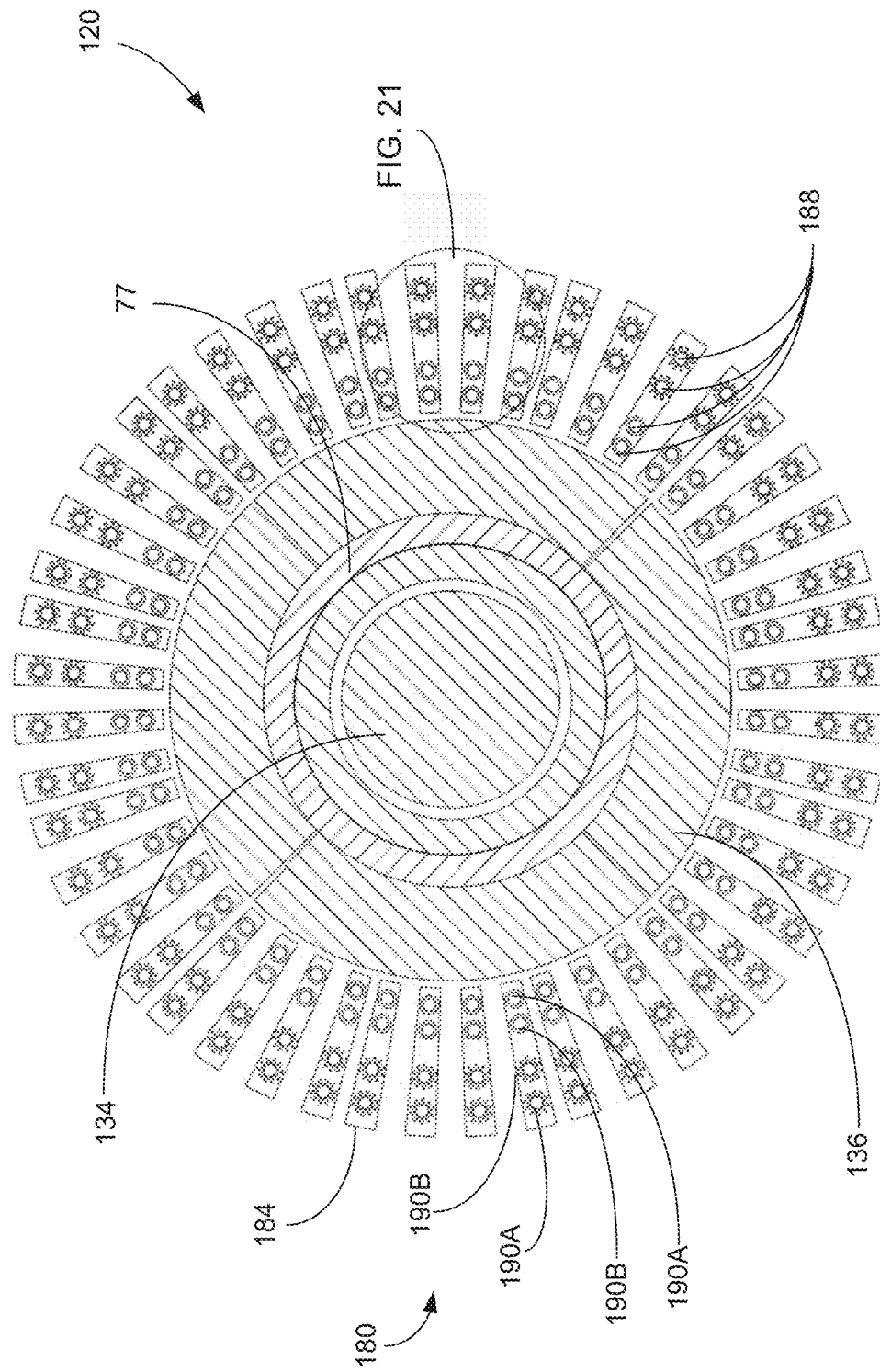
FIG. 20 is a cross-sectional plan view of an upper section of the CRDM cooling system.
Figure 21:
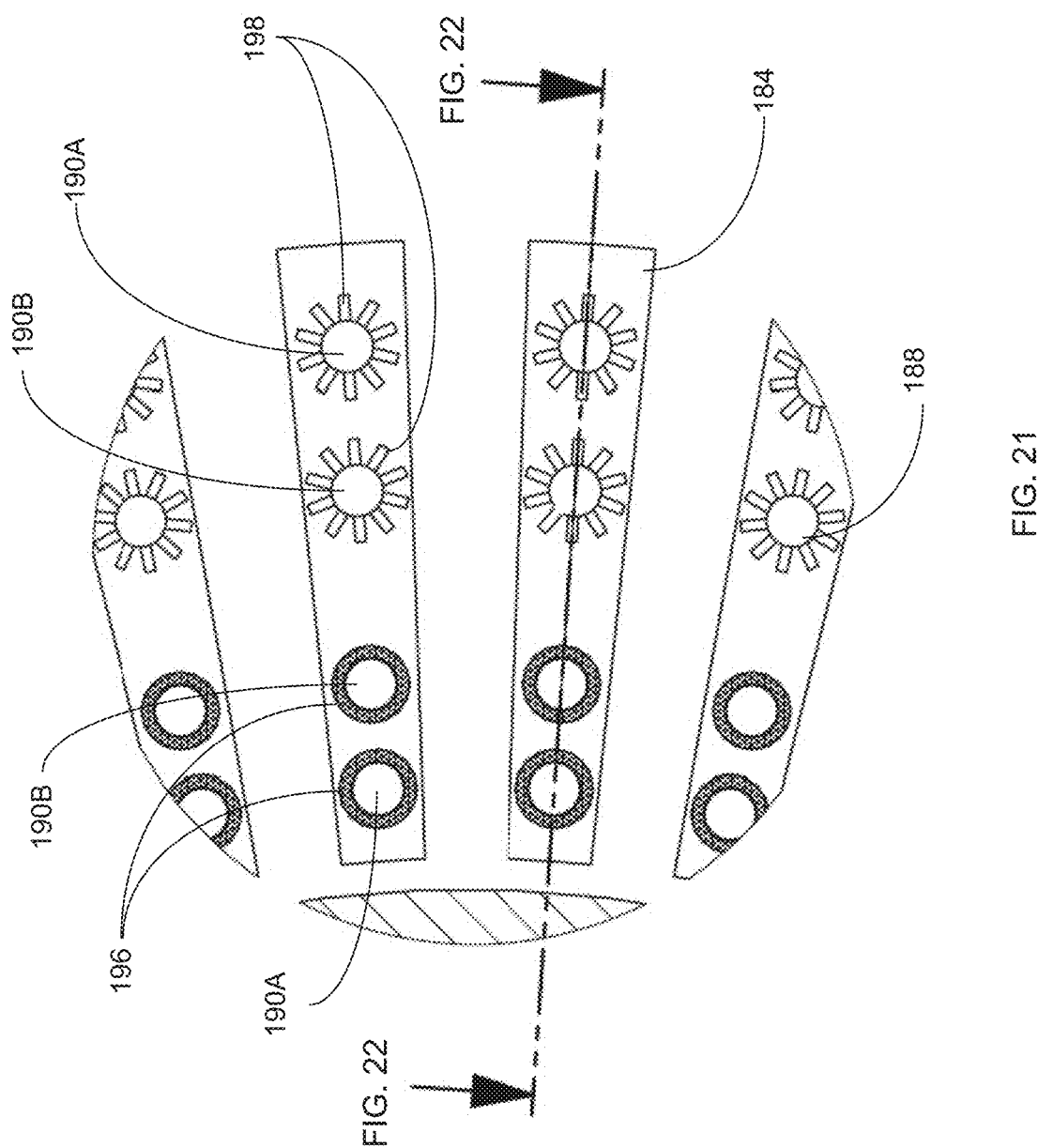
FIG. 21 is an expanded cross-sectional plan view of the upper section of the CRDM cooling system.

FIG. 20 is a cross-sectional plan view of an upper portion of CRDM cooling system 180 and FIG. 21 is an expanded plan cross-sectional view of the upper portion of CRDM cooling system 180. Cooling channels 188 extend vertically through heat fins 184 and again either form or retain tubes that operate as heat pipes 190. Cooling channels 188 connect or are continuously formed with channels 186 in drive coils 128 to form heat pipe loops 190.

As described above in FIGS. 5-7, cylindrical disconnect magnet 134 is attached to a top end of disconnect rod 132 (FIG. 7). Disconnect magnet 134 extends up into drive shaft housing 77 and annular disconnect coils 136 extend around drive shaft housing 77 and disconnect magnet 134. Heat fins 184 extend radially out from disconnect coils 136 and in one example contain the upper sections of heat pipes 190. Heat pipes 190A and 190B extend in half-loops up through each heat fin 184.

Evaporation sections of heat pipes 190A and 190B extend along the inner side of heat fin 184 and are covered by insulation 196 in heat fin 184. In one example, insulation 196 may be any type of mineral wool, calcium silicate, fiberglass, microporous refractory, glass fiber felt, reflective metallic insulation (RMI), or any other material normally used for insulating pipes in nuclear power plants.

Condensation sections of heat pipes 190A and 190B are fluidly coupled to the insulation sections of heat pipes 190A and 190B, extend along the outer lateral sides of heat fins 184, and are surrounded by condensation channels 198. In one example, condensation channels 198 are a group of highly heat conductive metal strips or slots that extend radially out from the outer surface of heat pipes 190. Condensation channels 198 expose more outer surface area of the condensation sections of heat pipes 190 to the cooler containment region 74 formed by CNV 70 (FIG. 17). Any other type of heat fin or heat sink may be formed within heat fins 184 around the condensation portions of heat pipes 190 to further increase the rate of heat transfer.

Figures 22, 23:
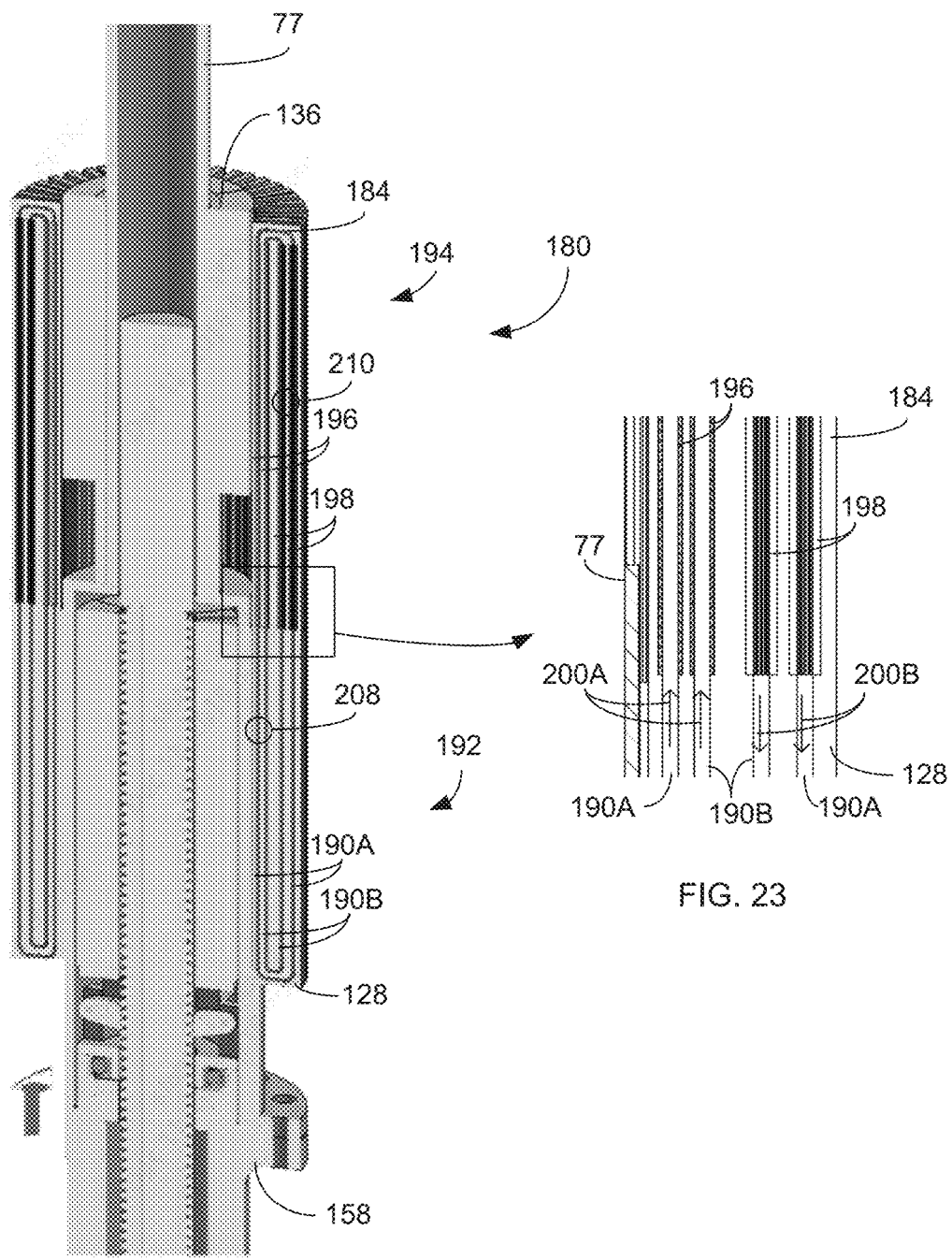
FIG. 22 is an isometric side sectional view of the CRDM cooling system.
FIG. 23 is an expanded isometric side sectional view of the CRDM cooling system.

FIG. 22 is an isometric side-sectional view of cooling system 180 and FIG. 23 is a more detailed isometric side-sectional view of cooling system 180. In this example, multiple pairs of outer and inner circular heat pipes loops 190A and 190B, respectively, extend through each drive coil 128 and heat fin 184. Outer heat pipes 190A extend along the inner and outer lateral sides of drive coils 128 and heat fins 184. Inner heat pipes 190B extend through drive coils 128 and heat fins 184 inside of outer heat pipes 190A.

Heat pipes 190 extend from the bottom ends up through top ends of drive coils 128 and then extend further up through the bottom ends to the top ends of heat fins 184. The top ends of heat pipes 190 extend radially out from disconnect coils 136, and the bottom ends of heat pipes 190 extend radially inward toward drive shaft housing 77 forming continuous loops.

An alternate option is to mount the colder upper sections 194 of heat pipes 190 directly to the inside wall of CNV 70 above CRDMs 88 where heat is transferred to the CNV surfaces by conduction. For example, heat pipes 190 may include loops that extend further up and out of the top of heat fins 184 or drive coils 128 and contact the inside wall of CNV 70. In both the alternatives once the heat is transferred to the CNV it is dissipated to the environment outside of the CNV.

The inner portions of heat pipes 190A and 190B located closer to the inner lateral sides of drive coils 128 and heat fins 184 are referred to as evaporation sections 208 and the outer portions of heat pipes 190A and 190B that extend closer to the outer lateral sides of heat fins 184 are referred to as condensation sections 210. Evaporation sections 208 and condensation sections 210 are fluidly coupled together.

Heat pipes 190 may comprise any round, oval, or flat shaped tube or orifice formed from any material, such as copper, aluminum, stainless steel, or any other heat conductive metal. Heat pipes 190 may contain any fluid 200 capable of transferring heat, such as water, ammonia, methanol, liquid sodium, or the like. When heated, fluid 200 may transform into an evaporated state 200A and when cooled may transform back into a condensed state 200B.

Evaporation and condensation of fluid 200 creates a fluid flow through heat pipes 190 that removes heat from drive coils 128. For example, drive coils 128 while in operation create heat that evaporates fluid 200A. Evaporated fluid 200A rises up through the evaporation section 208 of heat pipes 190 transferring heat away from drive coils 128.

As explained above, insulation material 196 in upper condensation section 210 of heat pipes 190 transfer evaporated fluid 200A. Condensation channels 198 in the upper condensation section 210 of heat pipes 190 coagulate evaporated fluid 200A into droplets of condensed fluid 200B. Other types of porous media may be used in heat pipes 190 to help coagulate evaporated fluid 200A into condensed fluid 200B.

Condensed fluid 200B drops vertically downward via gravity or capillary action through the condensation section 210 of heat pipes 190. Drive coils 128 then reheat condensed fluid 200B back into evaporated fluid 200A, recirculating fluid 200 back through heat pipes 190 and further removing heat from drive coils 128. A flow restrictor (not shown) may be located in heat pipes 190 upstream of drive coils 128 to control the flow direction and flow rate of fluid 200.

Passive cooling system 180 reduces or eliminates the number of water hoses, piping, and water pumping equipment normally used in active RCCWS systems. The simplified cooling system 180 also embeds heat pipes 190 in integrated drive coils 128 and heat fins 184 to provide a modular CRDM 88 design where electrical drive coils 128 can be more easily swapped out during maintenance operations. Cooling system 180 also overcomes limitations of convective heat cooling in Pressurized Water Reactor (PWR) CRDM designs where CRDM electrical coils 128 are located on the outside of the CRDM pressure boundary in a vacuum environment.

Having described and illustrated the principles of a preferred embodiment, it should be apparent that the embodiments may be modified in arrangement and detail without departing from such principles. Claim is made to all modifications and variation coming within the spirit and scope of the following claims.

Some of the operations described above may be implemented in software and other operations may be implemented in hardware. One or more of the operations, processes, or methods described herein may be performed by an apparatus, device, or system similar to those as described herein and with reference to the illustrated figures.

It will be apparent to one skilled in the art that the disclosed implementations may be practiced without some or all of the specific details provided. In other instances, certain process or methods have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope.

Although the examples provided herein have primarily described a pressurized water reactor and/or a light water reactor, it should be apparent to one skilled in the art that the examples may be applied to other types of power systems. For example, the examples or variations thereof may also be made operable with a boiling water reactor, sodium liquid metal reactor, gas cooled reactor, pebble-bed reactor, and/or other types of reactor designs.

It should be noted that examples are not limited to any particular type of reactor cooling mechanism, nor to any particular type of fuel employed to produce heat within or associated with a nuclear reaction. Any rates and values described herein are provided by way of example only. Other rates and values may be determined through experimentation such as by construction of full scale or scaled models of a nuclear reactor system.

The invention claimed is:
1. A nuclear reactor system, comprising:
a control rod drive mechanism (CRDM) including a plurality of drive coils extending about an axis; and
a cooling system including:

a plurality of heat fins coupled to the drive coils;
an evaporation section positioned within an inner portion of the drive coils and the heat fins;
a condensation section positioned within an outer portion of the drive coils and the heat fins, wherein the outer portion is positioned farther radially from the axis than the inner portion; and
a fluid configured to:
evaporate while in the evaporation section from heat absorbed from the CRDM and flow out of the evaporation section into the condensation section, and
condense while in the condensation section after moving away from the CRDM and recirculate back into the evaporation section.

2. The nuclear reactor system of claim 1, further comprising a plurality of disconnect coils configured to electromagnetically retain a disconnect magnet in the CRDM, wherein the heat fins extend around the disconnect coils.

3. The nuclear reactor system of claim 1, wherein the drive coils and the heat fins form an elongated annular shape around an annular drive shaft housing of the CRDM.

4. The nuclear reactor system of claim 1, wherein the cooling system includes a plurality of heat pipes that extend in loops through the drive coils and the heat fins, wherein the heat pipes define the evaporation section and the condensation section, and wherein the heat pipes contain the fluid.

5. The nuclear reactor system of claim 4, wherein the cooling system further includes insulation formed around inner portions of the heat pipes located in the heat fins.

6. The nuclear reactor system of claim 5, wherein the cooling system further includes condensation channels formed around outer portions of the heat pipes located in the heat fins.

7. The nuclear reactor system of claim 4, further comprising a vessel positioned to house the CRDM and a nuclear reactor, wherein the heat pipes extend from the CRDM to an inside surface of the vessel.

8. The nuclear reactor system of claim 1 wherein:
the drive coils are located around an outside surface of a drive shaft housing;
the CRDM includes:
drive magnets located around an inside surface of the drive shaft housing;
a drive shaft connected toward a top end to the drive magnets and connected toward a bottom end to a nuclear control rod assembly; and
the drive coils are positioned to receive electrical energy and to lift the drive magnets to raise the drive shaft and the nuclear control rod assembly, and wherein the cooling system is positioned to remove heat from the drive coils while the drive coils lift the drive shaft and the nuclear control rod assembly.

9. A nuclear reactor system, comprising:
a control rod drive mechanism (CRDM) including a plurality of drive coils; and
a cooling system including:
a heat fin coupled to the drive coils;
an evaporation section positioned within at least a portion of the drive coils;
a condensation section fluidly coupled to the evaporation section and positioned within a portion of the heat fin; and
a fluid configured to:
evaporate while in the evaporation section from heat absorbed from the CRDM and flow out of the evaporation section into the condensation section, and
condense while in the condensation section after moving away from the CRDM and recirculate back into the evaporation section.

10. The nuclear reactor system of claim 9, wherein the drive coils are positioned about an axis, wherein the cooling system includes a heat pipe extending in a loop, wherein the evaporation section is an inner portion of the loop, and wherein the condensation section is an outer portion of the loop positioned farther from the axis than the inner portion.

11. The nuclear reactor system of claim 9, wherein the drive coils are positioned about an axis, wherein the cooling system includes a plurality of heat pipes circumferentially spaced around the axis, wherein a first portion of the heat pipes defines the evaporation section, and wherein a second portion of the heat pipes defines the condensation section.

12. The nuclear reactor system of claim 11, wherein the heat pipes each extend in a loop, wherein the first portion of the heat pipes includes an inner portion of each of the loops, wherein the second portion of the heat pipes includes an outer portion of each of the loops, and wherein the outer portions are positioned farther from the axis than the inner portions.

13. The nuclear reactor system of claim 9, wherein the CRDM further includes a drive shaft coupled to a control rod assembly, and wherein the drive coils are operable to raise and lower the drive shaft.

* * * * *

UNITED STATES PATENT AND TRADEMARK OFFICE
CERTIFICATE OF CORRECTION

| | |
|---|---|
| PATENT NO. | : 11,355,252 B2 |
| APPLICATION NO. | : 16/229554 |
| DATED | : June 7, 2022 |
| INVENTOR(S) | : Christian Lobscheid et al. |

It is certified that error appears in the above-identified patent and that said Letters Patent is hereby corrected as shown below:

In the Specification

In Column 10, Line 27, delete "FIG." and insert -- FIGS. --.

Signed and Sealed this
Twenty-fifth Day of October, 2022

*Katherine Kelly Vidal*

Katherine Kelly Vidal
*Director of the United States Patent and Trademark Office*